(12) United States Patent  
Kapoor et al.

(10) Patent No.: US 12,411,807 B2  
(45) Date of Patent: Sep. 9, 2025

(54) CONTEXTUALLY WEIGHTED METALABELS FOR IMPROVED SEARCH IN HIERARCHICAL ABSTRACT DATA ORGANIZATION SYSTEMS

(71) Applicants: Sanjiv Kapoor, Naperville, IL (US); Ophir Frieder, Chevy Chase, MD (US)

(72) Inventors: Sanjiv Kapoor, Naperville, IL (US); Ophir Frieder, Chevy Chase, MD (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 18/200,700

(22) Filed: May 23, 2023

(65) Prior Publication Data

US 2024/0394223 A1 Nov. 28, 2024

Related U.S. Application Data

(63) Continuation of application No. 17/344,483, filed on Jun. 10, 2021, now abandoned, which is a continuation of application No. 16/047,126, filed on Jul. 27, 2018, now abandoned, which is a continuation-in-part of application No. 15/276,001, filed on Sep. 26, 2016, now Pat. No. 10,042,898, which is a continuation-in-part of application No. 14/936,178, filed on Nov. 9, 2015, now Pat. No.

(Continued)

(51) Int. Cl.

| G06F 16/16 | (2019.01) |
| G06F 16/14 | (2019.01) |
| G06F 16/17 | (2019.01) |
| G06F 16/185 | (2019.01) |

(52) U.S. Cl.  
CPC .......... G06F 16/164 (2019.01); G06F 16/144 (2019.01); G06F 16/1734 (2019.01); G06F 16/185 (2019.01)

(58) Field of Classification Search  
CPC .. G06F 16/164; G06F 16/144; G06F 16/1734; G06F 16/185  
USPC ........................................................ 707/821  
See application file for complete search history.

(56) References Cited

U.S. PATENT DOCUMENTS

| 6,671,772 B1 * | 12/2003 | Cousins | ................... | G06F 16/10 |
| | | | | 707/999.102 |
| 8,209,358 B2 * | 6/2012 | Frieder | ................... | G06F 16/22 |
| | | | | 715/845 |

(Continued)

*Primary Examiner* — Sheree N Brown  
(74) *Attorney, Agent, or Firm* — Pauley Erickson & Swanson

(57) ABSTRACT

A method in a data processing system and apparatus for organizing files, data items, web site members, or web pages, structured or unstructured, of multiple users stored across one or more server computers into hierarchical file structures on a recordable medium of a data processing system. A user-defined metalabel is assigned to each of the electronic files, data items, web site members, or web pages that are organized as a function of the metalabels into the hierarchical file structures. The method includes automatically weighting of individual metalabels as a function of a relevance of the at least one searchable term found in the corresponding one of the electronic files, data items, web site members, or web pages. Searching the plurality of hierarchical structures can then be done with a query including at least one term and a relevance threshold returning the matched data.

20 Claims, 17 Drawing Sheets

Related U.S. Application Data 9,633,028, which is a continuation-in-part of application No. 14/489,151, filed on Sep. 17, 2014, now Pat. No. 9,183,220, which is a continuation of application No. 14/147,233, filed on Jan. 3, 2014, now Pat. No. 9,128,954, which is a continuation-in-part of application No. 13/486,630, filed on Jun. 1, 2012, now Pat. No. 8,626,792, which is a continuation of application No. 12/471,938, filed on May 26, 2009, now Pat. No. 8,209,358, which is a continuation-in-part of application No. 11/801,296, filed on May 9, 2007, now Pat. No. 7,720,869.

(56) References Cited

U.S. PATENT DOCUMENTS

| | | | | |
|---|---|---|---|---|
| 8,626,792 B2 * | 1/2014 | Frieder | | G06F 16/22 |
| | | | | 707/778 |
| 9,128,954 B2 * | 9/2015 | Frieder | | G06F 16/22 |
| 9,183,220 B2 * | 11/2015 | Frieder | | G06F 16/168 |
| 10,042,898 B2 * | 8/2018 | Kapoor | | G06F 16/2455 |
| 10,558,657 B1 * | 2/2020 | Cheng | | G06F 16/93 |
| 2008/0281788 A1 * | 11/2008 | Frieder | | G06F 16/14 |
| 2009/0228462 A1 * | 9/2009 | Frieder | | G06F 16/22 |
| 2010/0318558 A1 * | 12/2010 | Boothroyd | | G06F 16/36 |
| | | | | 707/769 |
| 2012/0239658 A1 * | 9/2012 | Frieder | | G06F 16/14 |
| | | | | 715/810 |
| 2014/0122529 A1 * | 5/2014 | Frieder | | G06F 16/22 |
| | | | | 707/778 |
| 2015/0074562 A1 * | 3/2015 | Frieder | | G06F 16/185 |
| | | | | 707/827 |
| 2016/0103848 A1 * | 4/2016 | Frieder | | G06F 16/22 |
| | | | | 707/825 |
| 2017/0011046 A1 * | 1/2017 | Kapoor | | G06F 16/148 |
| 2018/0089260 A1 * | 3/2018 | Kapoor | | G06F 16/29 |
| 2018/0336223 A1 * | 11/2018 | Kapoor | | G06F 16/14 |
| 2020/0142911 A1 * | 5/2020 | Wexler | | G06F 16/14 |
| 2021/0303529 A1 * | 9/2021 | Kapoor | | G06F 16/22 |
| 2022/0027392 A1 * | 1/2022 | Kapoor | | G06F 16/29 |

* cited by examiner

CONTEXTUALLY WEIGHTED METALABELS FOR IMPROVED SEARCH IN HIERARCHICAL ABSTRACT DATA ORGANIZATION SYSTEMS

CROSS REFERENCE TO RELATED APPLICATIONS

This application is a continuation of U.S. application Ser. No. 17/344,483 filed on 10 Jun. 2021, which is a continuation of U.S. application Ser. No. 16/047,126 filed on 27 Jul. 2018, which is a continuation-in-part of U.S. application Ser. No. 15/276,001, filed on 26 Sep. 2016, now U.S. Pat. No. 10,042,898, which is a continuation-in-part of U.S. application, Ser. No. 14/936,178, filed on 9 Nov. 2015, now U.S. Pat. No. 9,633,028, which is a continuation-in-part of U.S. application Ser. No. 14/489,151, filed on 17 Sep. 2014, now U.S. Pat. No. 9,183,220, which is a continuation of U.S. application Ser. No. 14/147,233, now U.S. Pat. No. 9,128,954, filed on 3 Jan. 2014, which is a continuation-in-part of U.S. application Ser. No. 13/486,630, now U.S. Pat. No. 8,626,792, filed on 1 Jun. 2012, which is a continuation of U.S. application Ser. No. 12/471,938, filed on 26 May 2009, now U.S. Pat. No. 8,209,358, which is a continuation-in-part of U.S. application Ser. No. 11/801,296, filed on 9 May 2007, now U.S. Pat. No. 7,720,869.

BACKGROUND OF THE INVENTION

Field of the Invention

This invention is directed to improving searching and/or organizing electronic data in a data processing system or web site.

Discussion of Related Art

Traditional file systems, including both UNIX and WINDOWS, have one hierarchical method of file organization, herein referred to as a traditional or first hierarchical file structure, which is tree structured with directories and subdirectories. A typical user may have a large set of files (say 100,000), and the structured tree file organization can be several levels in height. The primary characteristics of the file systems are: 1) a file is accessed by a unique address known as the file path; and 2) file organizing is by using server names, directories, subdirectories, and/or filenames with an extension.

This single method of organizing data leads to considerable inefficiencies in accessing files. Searching is effective when the user knows a partial filename and/or the file path or directory under which the file is stored. Often a user must go through a number of files before locating a set of relevant files, and must open a number of directory/subdirectory folders to access the files. Further the current hierarchical organizing technique does not allow the users to easily describe or annotate a file.

To improve the search, current file systems use a variety of techniques. As an example, Mac OS uses a SPOTLIGHT feature that indexes files on your computer in the background based upon keywords. When a user makes a change, such as adding a new file, receiving an email, or entering a new contact, SPOTLIGHT updates its index automatically, with the intention of keeping search results accurate. Embedding keywords into files is a common technique for providing a search facility to the user. Keywords are generally indexed in a database that is used to answer user queries.

There is a need for an improved method for organizing and searching files or other data on a computer or web site, as well as organizing the search results.

SUMMARY OF THE INVENTION

A general object of the invention is to provide an improved method for organizing and searching for electronic files or data on a computer-readable recordable medium, and the apparatus and/or program code(s) for carrying out the method in a data processing system.

The general object of the invention can be attained, at least in part, through a method in a data processing system of searching electronic files or other data items that are on a recordable medium of the data processing system. The method includes: providing electronic files, data items, web site members, or websites in one or more first hierarchical file structures, such as each belonging to a plurality of users, the electronic files or websites being identified by filename, file path, member identification, and/or domain address; assigning user-defined metalabels to the electronic files or websites, wherein the electronic files or websites include the filenames or domains and the metalabels; and organizing the electronic files data items, web site members, and/or websites into a second hierarchical file structure as a function of the metalabels. The second hierarchical file structure is achieved without replicating the files of the first hierarchical file structure.

The method of this invention provides an additional file and/or data organization system that extends the file organization into a multi-hierarchy user defined system. The additional hierarchical file structures of this invention are abstract data file structures, as they exist in the background and are not conventionally viewed through a user interface like the traditional file directories, subdirectories, and filenames. However, they can also be viewed in the same way although their physical existence will be according to the first hierarchy. In the system of this invention the data are organized into multiple hierarchical forms which aid considerably in searching and organizing search results, i.e., files, in a structured fashion.

As an example consider the following structure (directories/subdirectories) of electronic files, represented in FIG. 1.

Pictures/2006/Dad
Pictures/2005/Dad
Pictures/2006/Mom
Pictures/2005/Mom
Picture/2006/Baby
Pictures/2005/Baby If a user wanted to access all files which involve dad, even files not having "Dad" in the filename but including dad in the picture, the number of files may be substantial and spread among multiple subdirectories. Thus, if you were looking for all dad-related pictures, it would be desirable that these pictures may be classified as below, and as shown in the abstract directory structure of FIG. 2.

Pictures/Dad/2005
Pictures/Dad/2006
Pictures/Dad/Baby
Pictures/Dad/Mom

The method of this invention provides a way to provide, in a general sense, multiple organizational tree structures for the same electronic files in addition to the traditional file directory tree structure. These additional hierarchical file structures are provided by this invention by structuring the electronic files in one or more abstract directories according to user-defined metalabels. When the user searches based upon an assigned metalabel, the program code implementing this invention provides the corresponding electronic files in a new file directory, such as shown in FIG. 2. As the directory of FIG. 2 exists as a result of wanting all pictures identified by the metalabel "dad", the directory of FIG. 2 is an abstract directory that is created in response to a query for the "dad" metalabel and exists simultaneously with, and does not replace or alter, the first hierarchical file structure of FIG. 1.

Embodiments of the invention include a web-scan system for automatically scanning remote web pages on a network and creating metalabels for each of the web pages from text extracted from the web pages.

The methods and file structures according to this invention can also be applied to organizing data sets as well as web pages and member users of social networking web sites. The invention further includes a method for organizing data items, files, web pages, or web site members. The method includes assigning a user-defined metalabel for each of a plurality of data items, electronic files, web pages, or web site members, where each metalabel is an identifier in addition to a filename, a domain address, or a member identification, and more than one of the plurality of data items, electronic files, web pages, or web site members is assigned the same user-defined metalabel. The method further includes automatically organizing user-defined metalabels in a hierarchical file structure with a data processor where the hierarchical file structure comprises a trie, storing each of the user-defined metalabels in a database associated with the data processor, and linking each of the stored user-defined metalabels to one or more corresponding data items, electronic files, web pages, or web site members of the user-defined metalabel. The invention further includes the aggregation of metalabels of multiple users in additional hierarchical data sets, file structures, web-site members or web pages. In one embodiment, the underlying data (e.g., the data items, files or websites) has a metalabel identifier that is encoded and searchable on the corresponding hardware or computer system. A data processor according to this invention, such as controlled by a further or 'super' user beyond the multiple users, maps the multiple user identifiers and structures the metalabel identifiers into multiple hierarchies to thereby define multiple taxonomies on the space of data items, files, web-site members or web pages. These hierarchies can be viewed by a GUI or browser system, if desired, and provide alternate views or taxonomy on the underlying data space.

Embodiments of this invention include a computer-implemented method for organizing files, data items, web site members, or web pages, the method comprising: automatically determining with a data processor user-defined metalabels of a plurality of users (e.g., a plurality of different computer systems) for each of a plurality of electronic files, data items, web site members, or web pages; and the data processor automatically aggregating the metalabels of the plurality of user into a plurality of hierarchical file structures. In some embodiments the method includes: automatically determining with a data processor first user-defined metalabels of a first user for each of a plurality of first user electronic files, data items, web site members, or web pages; automatically determining with a data processor second user-defined metalabels of a second user for each of a plurality of second user electronic files, data items, web site members, or web pages; and the data processor automatically aggregating the first user-defined metalabels and the second user-defined metalabels into a plurality of hierarchical file structures. Each of the plurality of user-defined metalabels in the plurality of hierarchical file structures desirably, but not necessarily, provides a server computer location of the each of the plurality of electronic files, data items, web site members, or web pages, such as for querying purposes.

The invention also includes an apparatus for organizing files, data items, web pages, or web site members, that includes a taxonomy handler comprising a processor and a database and for receiving and storing user-defined metalabels for electronic files or web pages in user file structures of a plurality of users. Each metalabel is an identifier in addition to a user filename or a user domain address, etc., to organize the electronic files, data items, web site members, or web pages as a function of the metalabels into a plurality of additional hierarchical file structures existing simultaneously with the user file structures. More than one of the plurality of electronic files, data items, web site members, or web pages is assigned a same user-defined metalabel to organize the more than one of the plurality of electronic files or web pages in a same additional hierarchical file structure. The plurality of additional hierarchical file structures can be overlapping file structures, and the plurality of users can each include a different computer. Software code stored on a recordable medium and executable by the taxonomy handler desirably establishes and maintains the additional hierarchical file structures.

The invention further includes a computer-implemented method for organizing files, data items, web site members, and/or web pages, by automatically aggregating with a first data processor user-defined metalabels of a first user for each of a first plurality of electronic files, data items, web site members, or web pages into a first plurality of hierarchical structures, wherein each of the first plurality of electronic files, data items, web site members, or web pages is identifiable by a filename, file path, member identification, or domain name on a corresponding one of a first plurality of server computers, and automatically forming for the first user or a second user a personalized second plurality of hierarchies from the user-defined metalabels of the first user as a function of a predetermined profile of the first user or the second user. In embodiments of this invention, the personalized second plurality of hierarchies can be a shadow copy of the first plurality of hierarchical structures, such as for use on a mobile electronic device of the first or second user.

The invention yet also includes a computer-implemented method for organizing files, data items, web site members, and/or web pages, by automatically aggregating with a data processor user-defined metalabels of a plurality of users for each of a plurality of electronic files, data items, web site members, or web pages into a plurality of hierarchical structures, wherein each of the plurality of electronic files, data items, web site members, or web pages is identifiable by a filename, file path, member identification, or domain name on a corresponding one of a plurality of server computers, automatically forming keywords, where each keyword is a string of at least two of the user-defined metalabels or a portion thereof, and automatically forming search structures of the keywords existing simultaneously with the plurality of hierarchical structures. In embodiments of this invention, the search structures can be tries of the keywords, such as where each trie node comprises a keyword.

In embodiments of this invention, the taxonomy structure of the metalabel hierarchies discussed above can be enhanced to incorporate relevancy rankings. The invention includes a computer-implemented method for organizing files, data items, web site members, or web pages, that includes: automatically organizing with a data processor user-defined metalabels for each of a plurality of electronic files, data items, web site members, or web pages into a plurality of hierarchical structures, wherein each of the electronic files, data items, web site members, or web pages is identifiable by a filename, file path, member identification, or domain name on a corresponding computer, and each of the plurality of user-defined metalabels in the plurality of hierarchical structures provides a computer location of the each of the plurality of electronic files, data items, web site members, or web pages; and automatically weighting each of the user-defined metalabels as a function of relevance. The ranking(s), which can be preference rankings, are desirably integrated with the hierarchical metalabels to organize and search tagged data efficiently.

In embodiments of this invention, the computer-implemented method for organizing electronic files, data items, web site members, or web pages, includes: automatically organizing with a hardware data processor user-defined metalabels for each of a plurality of electronic files, data items, web site members, or web pages into a plurality of hierarchical structures, wherein each of the electronic files, data items, web site members, or web pages includes at least one searchable term found therein and is identifiable by a filename, file path, member identification, or domain name on a corresponding computer, and each of the plurality of user-defined metalabels in the plurality of hierarchical structures provides a computer location of the each of the plurality of electronic files, data items, web site members, or web pages. The method includes automatically and individually weighting each of the user-defined metalabels as a function of a relevance of the at least one searchable term found in the corresponding one of the electronic files, data items, web site members, or web pages, and automatically associating the corresponding weighting with each of the user-defined metalabels. Again, the weighting can be used to organize and/or filter searches and search results.

In embodiments of this invention, the relevance is determined from a dynamic importance vector. For example, the weighting of the user-defined metalabels can be as a function of user metalabel access frequency, or a frequency of the at least one searchable term in a corresponding one of the electronic files, data items, web site members, or web pages. Determining the relevance can also include providing each of the metalabels with a corresponding static term matrix, such as providing each of the metalabels with a corresponding static term matrix based upon the frequency of searchable terms for the each of the metalabels.

In embodiments of this invention, each metalabel comprises a node in the plurality of hierarchical structures, and each node includes the corresponding term matrix. The invention further includes embodiments of automatically and individually weighting each of the user-defined metalabels as a function of a relevance of the searchable terms found in the corresponding one of the electronic files, data items, web site members, or web pages, by automatically associating each node with a corresponding static term matrix including the searchable terms for the node. In such embodiments, an internal node in the plurality of hierarchical structures can include searchable terms from all corresponding child nodes.

Searching the plurality of hierarchical structures with weighted metalabels can be done with a query including at least one term and a relevance threshold. The search result includes any one or more of the plurality of electronic files, data items, web site members, or web pages having a metalabel and relevancy weighting matching the query.

In embodiments of this invention, which can be implemented either independent or in combination of the weighting or other features above, uses hierarchical metalabels in a geographic context. The invention provides heterogeneous string structures combined with range structures. The invention includes a computer-implemented method for organizing files, data items, web site members, or web pages that includes: automatically structuring the data in a heterogeneous string structure, such as the plurality of user-defined metalabel hierarchical structures discussed above and herein; and automatically embedding an n-dimensional range structure within the heterogeneous string structure. The n-dimensional range structure can include at least one of coordinates or dimensions, such as, for example, a three-dimensional range structure and/or a geometric range, with a minimum or maximum value.

Other objects and advantages will be apparent to those skilled in the art from the following detailed description taken in conjunction with the appended claims and drawings.

DEFINITIONS

Figure 1:
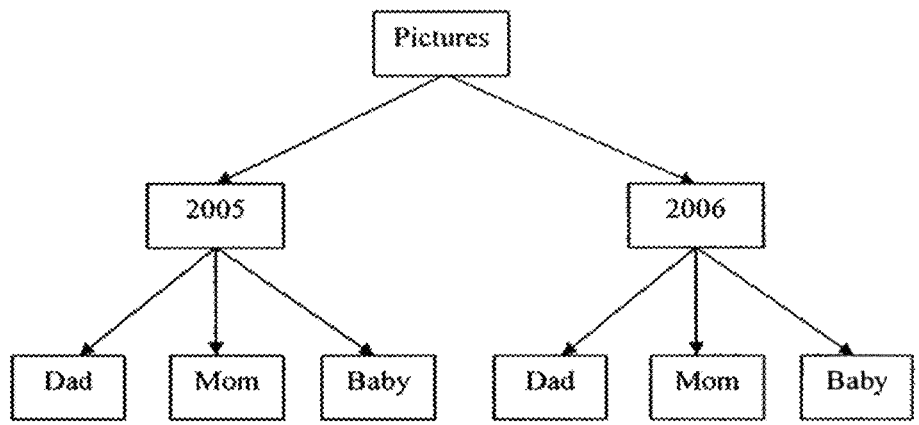
FIG. 1 is a simplified representation of traditional hierarchical file structure.

Within the context of this specification, each term or phrase below will include the following meaning or meanings.

References herein to "metalabel" are to be understood to refer to an identifier given to an electronic file, data item, web page, or web site member in addition to the file's filename and/or file path, a web page's domain address, or the web site member's member identification name. A metalabel of this invention can include any combination of characters, e.g., letter or numbers, and desirably includes a term that a user identifies with the file.

References herein to "user" are to be understood to not be limited to a creator of an electronic file, but can be any person, process, or autonomous software agent, as known in the art, acting on behalf of a user having access to the electronic files.

References herein to a "first hierarchical file structure" or a "traditional hierarchical file structure" are interchangeable and to be understood to refer to the already existing directory tree structure commonly used in organizing electronic files in data processing systems. The first or traditional hierarchical file structure generally includes a plurality of directories and subdirectories, and individual files are given a filename and a file's placement in the tree structure is identified by a file path.

References herein to the "second hierarchical file structure" or "additional hierarchical file structure(s)" of this invention are interchangeable and to be understood to refer to a different hierarchical file or data structure than the first or traditional hierarchical file structure.

References herein to "abstract directory" are to be understood to refer to a directory in or created for the second hierarchical file structure of this invention.

DESCRIPTION OF PREFERRED EMBODIMENTS

The present invention provides a method in a data processing system, e.g., a computer, for organizing and of searching electronic files, data items, web pages, and/or web site members, on a recordable medium of one or more data processing systems, e.g., computer hard drives or flash drives. It is important to note that this invention is not limited to recordable medium that is physically adjacent to a computer. Instead, it is also within the scope of this invention that some and possibly all of the files reside in remote locations whose access is via a network including but not limited to such networks as local area networks, wide area networks, private virtual networks, ad hoc networks, and the Internet.

Also, users according to this invention, as defined above, are not limited to human users. That is, as known in the art, processes or other autonomous software agents can assist or even replace humans in terms of computer processing. Thus, it is within the scope of this invention for processes or software agents to generate the user request described herein.

The method of this invention improves searching for electronic files, to items, web site members, and or web pages in, for example, current existing hierarchical file structures, such as are formed of the directories and subdirectories currently employed in operating systems. In such traditional hierarchical file structures, often referred to as tree structures, each of the electronic files, data items, web site members, or web pages includes, for example, a given filename, member identification, or domain name, respectively, that is seen by the user through a user interface, e.g., computer monitor, and a file path identifying the location within the hierarchical file structure. For simplicity, embodiments will be described below with particular reference to electronic files.

As discussed above, current searching of the electronic files in the traditional hierarchical file structure, as represented in FIG. 1, is typically based upon the filename or other information about the file itself, such as the file type or extension. The method of this invention provides a second hierarchical file structure, and desirably a plurality of additional hierarchical file structures. These additional hierarchical file structures are "abstract" in that they remain in the background, do not require a physical presence that is directly accessible to the user through the user interface, as does the first hierarchical file structure, but may be viewable in a similar fashion. The abstract additional hierarchical file structures of this invention supplement, and do not replace or replicate portions of, the first hierarchical file structure to improve searching of the electronic files in the hierarchical file structure.

In one embodiment of this invention, each of at least a portion of the electronic files stored in one or more data processing systems is assigned a user-defined metalabel. The computer code that implements all or portions of the method of this invention receives the user-defined metalabel, such as through a keyboard, and assigns the metalabel to the intended electronic file. The metalabel does not supplant the file name or file path of the electronic file.

Figure 2:
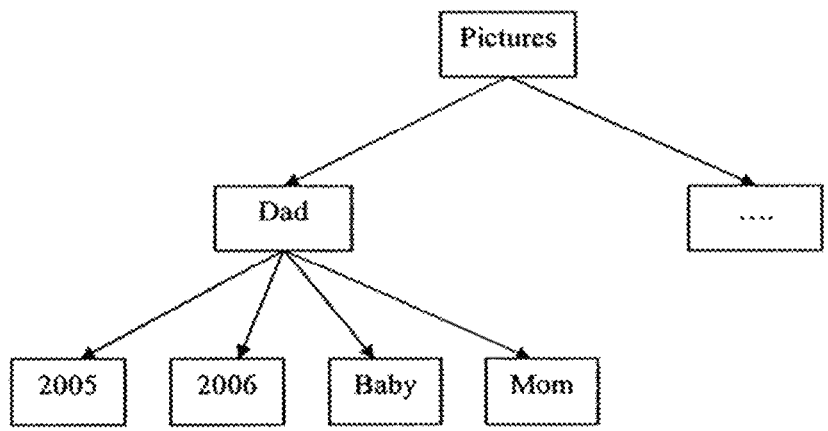
FIG. 2 is an exemplary abstract directory structure adapted from the traditional hierarchical file structure of FIG. 1, according to one embodiment of this invention.

The metalabel of this invention provides users with the possibility to describe or annotate a file with user defined words and/or numbers, which allows another way to search for the files. The electronic files are searched in this invention by querying the metalabels. For example, the data processing system receives a query from a user, searches the metalabels of the second hierarchical file structure according to the query, and returns to the user the search results, which include the electronic file or files including a metalabel matching the query. In one embodiment, the search results are provided in or by an abstract directory structure, such as illustrated in FIG. 2. The query can include the full metalabel, or a portion of the metalabel. In one embodiment of the invention, the query can include a portion of the metalabel coupled with a wildcard symbol, such as, for example, an asterisk or other character, to represent one or more letters or numbers.

In one embodiment of this invention, a program code organizes the electronic files as a function of the metalabels into a second hierarchical file structure existing simultaneously with the first hierarchical file structure on the recordable medium of the data processing system. A plurality of metalabeled electronic files are organized into one or more additional hierarchical file structures by linking each metalabel of the electronic files to a matching metalabel assigned to one or more of the other electronic files. Each metalabel that is assigned to an electronic file is linked to a matching metalabel, should such a matching metalabel exist, of another electronic file. The link between the metalabels remains even when one or more electronic files are, for example, moved or given a new file name. The additional file structures provided by the metalabels are desirably automatically updated when, for example, an electronic file is moved within, copied, or deleted from the first and traditional hierarchical file structure.

In one embodiment of this invention, hierarchical metalabels have the form:

(i) <metalabel> or
(ii) <metalabel1>/<metalabel2>/....<metalabelk>.

Figure 3:
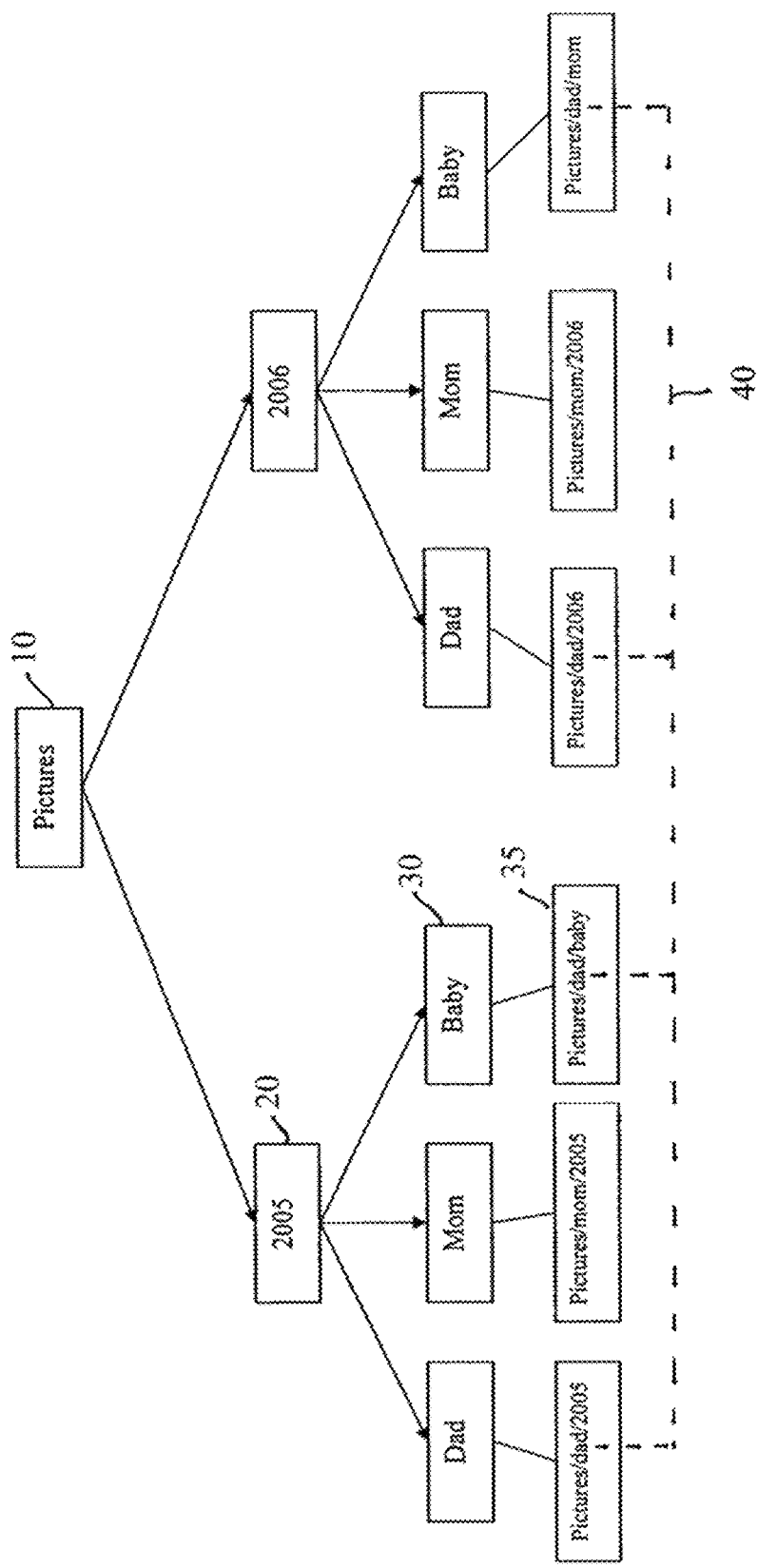
FIG. 3 represents a simplified application of metalabels to electronic files in the traditional hierarchical file structure of FIG. 1, according to one embodiment of this invention.

Metalabel form (i) provides a flat result with all the search results in one single abstract directory. Metalabel form (ii) supports structured searching and reporting. As an example referring to the file structure of FIG. 1, the following metalabels could be assigned to electronic files therein as shown in FIG. 3:

Pictures/dad/2005
Pictures/dad/2006
Pictures/dad/baby
Pictures/dad/mom
Pictures/mom/2005
Pictures/mom/2006

A query for "Pictures/" would provide an abstract directory with the subdirectories "dad/" and "mom/" and the search for "Pictures/dad" would provide an abstract directory with the subdirectories "2005/", "2006/", "baby/", and "mom/". In general, a search for <Dir>/provides all files labeled <Dir>/<file> and all directories, <dir>, of files labeled */<Dir>/<dir>/*. As will be appreciated by those skilled in the art following the teachings herein provided, directories may also be assigned metalabels with the same methodology as described herein for individual files.

The metalabels allow a system user to further describe or label a file according to, for example, the content or purpose of the file. Referring to FIG. 3, the electronic file 35 is in subdirectory 30 named "Baby", which is in subdirectory 20 named "2005", which is in directory 10 named "Pictures". The user, e.g., the file creator, enters a metalabel "Pictures/dad/baby" for the electronic file 35. In this example, the electronic file 35 is a picture that includes both dad and baby, and while the placement in the traditional file structure places the electronic file in the "Baby" subdirectory 30, associating the metalabels "dad" and "baby" allows the computer to link this file with other similar metalabeled files in other subdirectories. As shown in FIG. 3, the dashed line 40 indicates the linking for the metalabels "dad". Thus a query of the metalabel "dad" provides as search results the linked files. As discussed above, the abstract directories resulting from the query for metalabel "dad" would be "2005/", "2006/", "baby/", and "mom/" as illustrated in FIG. 2.

Figure 4:
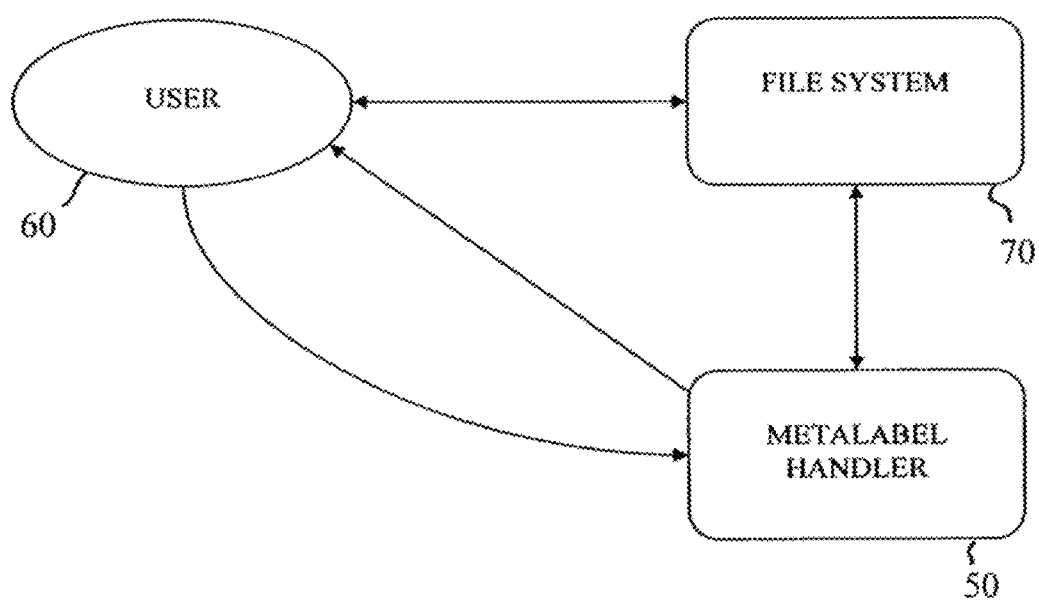
FIG. 4 is a representation of the interaction between the user and the file system according to one embodiment of this invention.

In one embodiment of this invention, a metalabel handler module or functionality, desirably implemented as a client-server module, is provided in the data processing system. As represented in FIG. 4, the metalabel handler 50 interacts with the user 60 to manage the user's metalabel manipulations, including commands such as add, modify, and remove metalabels for files. The metalabel handler 50 also desirably implements the metalabel search functions of this invention. The metalabel handler 50 interacts with the existing traditional hierarchical file structure, i.e., file system 70, to serve the requests from the client, user 60, and make the requested modifications to update the additional hierarchical file structure(s) whenever an electronic file is moved, copied, or deleted.

In one embodiment of this invention, the additional hierarchical file structures are implemented as tries, and desirably Patricia tries. In this embodiment electronic files are organized into a second hierarchical file structure by locating or creating a node in the trie that is identified with the metalabel of the file and associating the filename to the metalabel in the trie. As an alternative, and more desirably used in combination in the double trie structure discussed below, organizing the metalabel into the second hierarchical file structure is accomplished by locating or creating a node in the trie that is identified with the filename and associating the metalabel to the filename in the trie.

Figure 5:
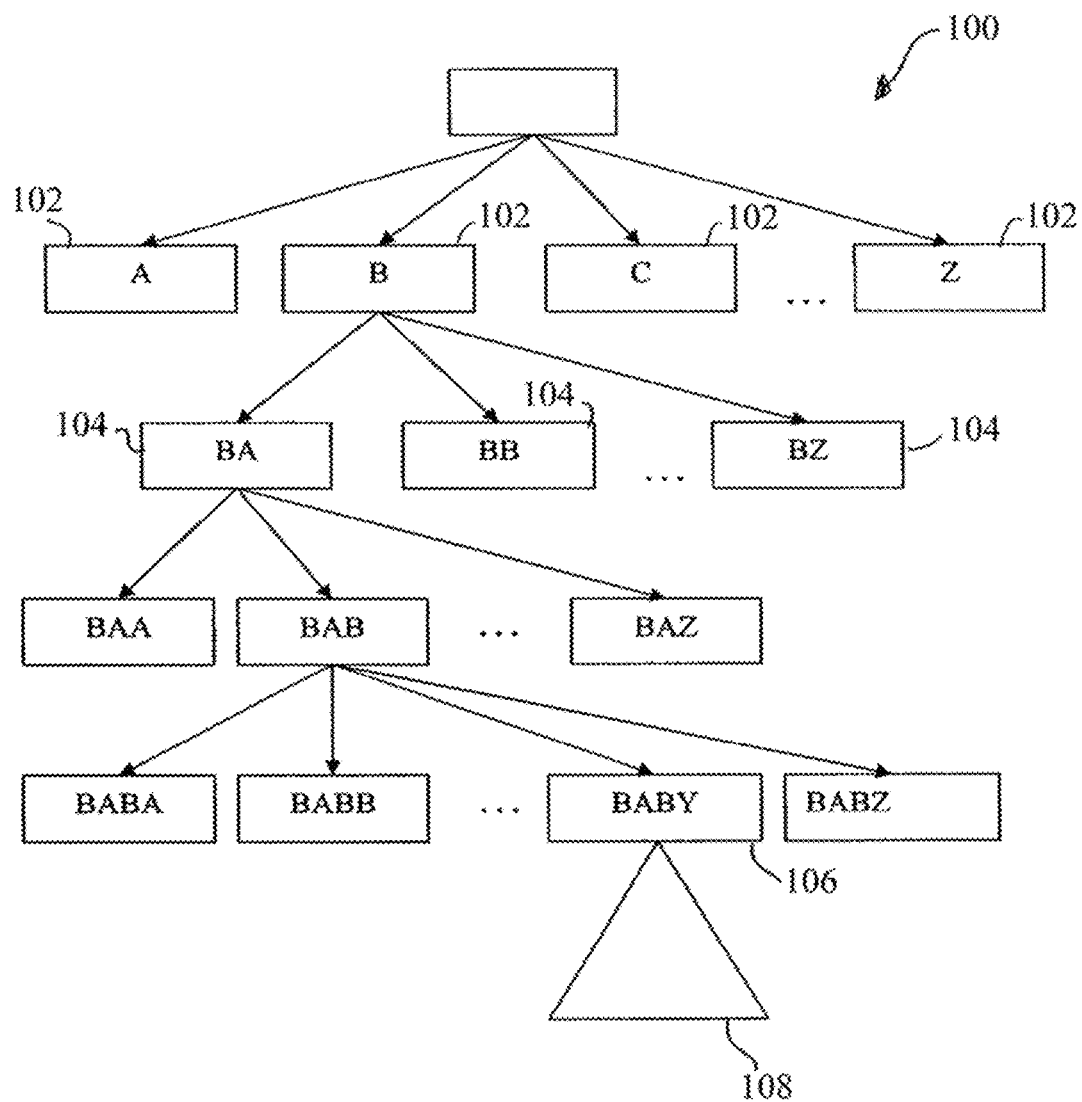
FIG. 5 is a theoretical trie structure for illustrative purposes.

FIG. 5 illustrates a general hypothetical trie structure 100 to provide a preliminary understanding to assist in the explanation of the subject invention, and is not intended to limit the invention in its application. In the hypothetical trie structure 100 of FIG. 5, there is a node 102 available for each letter of the alphabet. Note that herein the approach is illustrated using an English language character set, but one skilled in the art will recognize that any character set is possible. Referring to the node for "B", each node 102 will connect to a further plurality of available nodes 104 representing "B" plus a further letter, i.e., "BA"-"BZ". The trie structure of FIG. 5 continues in this manner and ultimately provides the node 106 for "BABY". According to this invention, the "BABY" node 106 contains the electronic files, and more accurately, the filenames and file paths of the electronic files, associated with the metalabel "BABY". The electronic files are represented in FIG. 5 by triangle 108. Thus, when a new file and/or metalabel is/are added, the data processing system organizes the metalabel into the trie structure of the additional hierarchical file structure and associates the filename with a corresponding node. The electronic file is desirably not duplicated.

Figure 6:
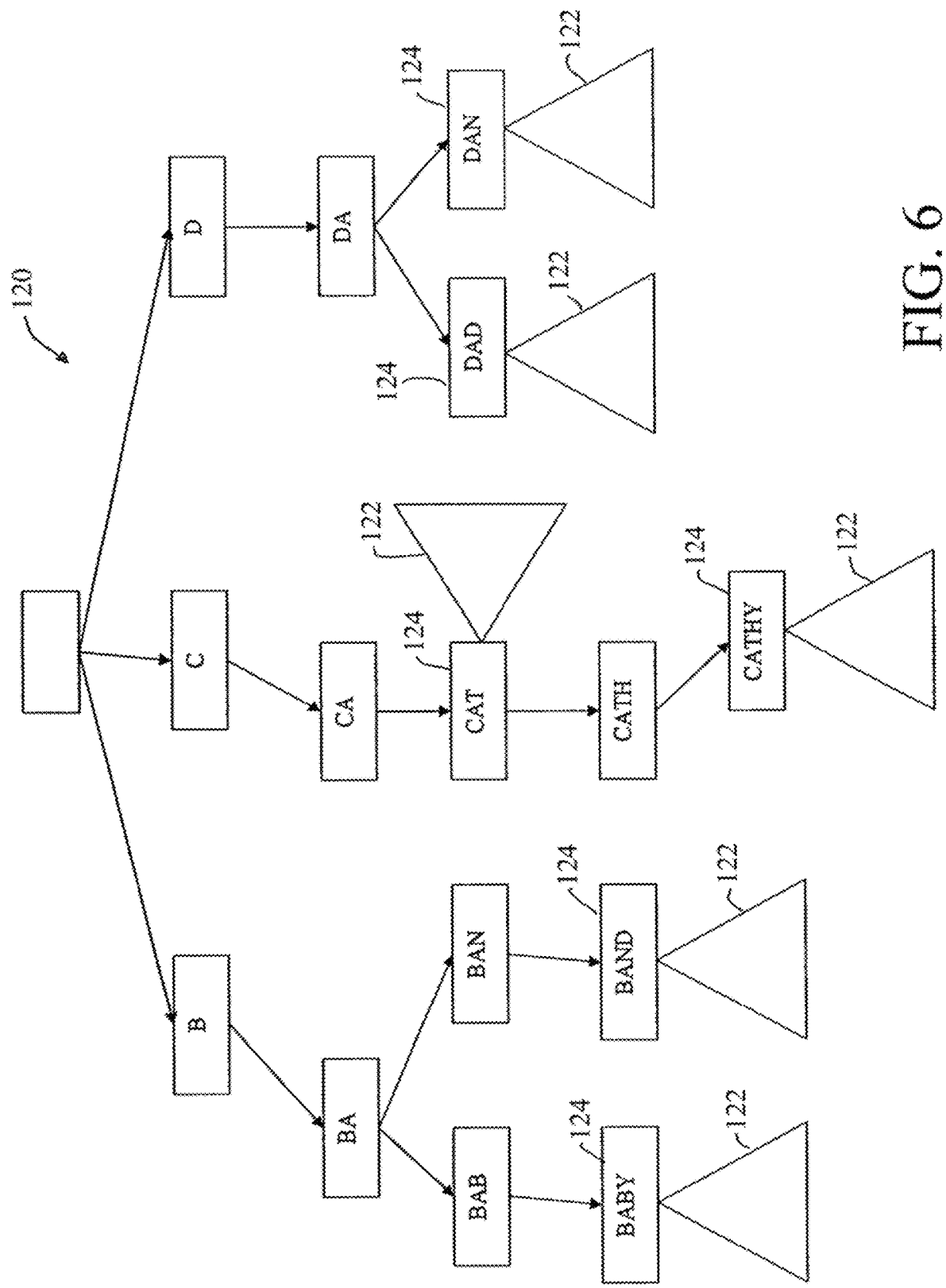
FIG. 6 is an exemplary trie structure according to one embodiment of this invention.

As will be appreciated by those skilled in the art following the teachings herein, the trie structure of FIG. 5, for preliminary explanation purposes contains nodes for potentially all combination of letters. In actual implementation, trie structures contain nodes according to need, such as illustrated in FIG. 6. FIG. 6 is an example illustration of a trie structure 120 for the metalabels "BABY", "BAND", "CAT", "CATHY", "DAD", and "DAN". In FIG. 6, only nodes related to actual metalabels are present, and unnecessary nodes do not exist. As in FIG. 5, the filenames of the electronic files are represented by triangles 122. Each triangle 122 is attached to one of the metalabel nodes 124, and includes filenames and file paths of the electronic files the user has assigned a metalabel with the metalabel matching the associated node 124.

In one embodiment of this invention, the additional hierarchical file structure is implemented as a double trie structure. Both tries of the double trie structure are desirably Patricia tries. The first trie uses the metalabels as keywords. As shown in FIG. 6, each node of the trie corresponds to a unique metalabel. Each node in turn desirably contains an internal secondary trie structure to further store a list of files that have been tagged with the specified metalabel. To provide faster results, the second trie of the double trie structure uses the filenames of the electronic files as the keywords, with the secondary trie structure, represented as the triangles in figures, containing the metalabels of the files.

For each add, modify, and update metalabel command, the trie structures are suitably modified. The file copy, move, and delete commands of a UNIX file system can be modified to create metalabeled copy, metalabeled move, and metalabeled delete commands. These commands modify the trie structures while performing the file system commands.

The following is an example of an algorithm for the double-trie implementation of the second hierarchical file structure of this invention.

Data Structures Used
1. File Trie: a Patricia Trie, with each node possibly containing a contains-metalabel sub-trie; and
2. Metalabel Trie: a Patricia Trie, with each node possibly containing a files-metalabeled sub-trie.

Adding a Metalabel to a File

```
addmetalabel(<filename>, <metalabel>)
    (i)  // Metalabel Trie Structure
        a. Locate the subtrie which is identified with the key <metalabel>
           in the Metalabel Trie
        b. If not found, create a node (and files-metalabeled subtrie) in
           the Metalabel Trie for the given metalabel.
        c. If subtrie already contains "filename",
               return error. (File is already tagged with the same
               metalabel)
           Else
               add "filename" to the files-metalabeled subtrie.
    (ii) // File Trie Structure
        a. Locate the contains-metalabel subtrie corresponding to the
           given filename in the File Trie.
        b. If not found, create a node (and contains-metalabel subtrie) in
           the File trie, for the given filename.
        c. If subtrie already contains "metalabel", return error. (File is
           already tagged with the same metalabel).
           Else
               add "metalabel" to the contains-metalabel subtrie.
```

Removing a Metalabel to a File

```
removemetalabel(<filename>,<metalabel>)
    1. // Metalabel Trie Structure.
        a. Locate the files-metalabeled subtrie corresponding to the given
           metalabel in the Metalabel Trie
        b. If not found, return error. (No such metalabel found)
        c. If subtrie doesn't contain "filename", return error. (No such
           metalabel for the file).
           Else
               i. remove "filename" from the files-metalabeled
                  subtrie.
               ii. if subtrie is empty, then remove the metalabel from
                   Metalabel Trie
    2. // File Trie Structure
        a. Locate the contains-metalabel subtrie corresponding to the
           given filename in the File Trie.
        b. if not found, return error. (No such file found in index)
        c. if subtrie doesn't contain "metalabel", return error. (No such
           metalabel for the file).
           Else
               i. remove "metalabel" from the contains-metalabel
                  subtrie.
               ii. if subtrie is empty, then remove the filename from
                   File Trie
```

List Metalabels of a File

```
listmetalabels(<filename>)
    1. // File Trie Structure
        a. Locate the contains-metalabel subtrie corresponding to the
           given filename in the File Trie.
        b. if not found, return error. (No such file found in index)
           Else
               return the contents of the contains-metalabel subtrie.
```

List Files with a Metalabel

```
listfiles(metalabel)
    1. // Metalabel Trie Structure
        a. Locate the files-metalabeled subtrie corresponding to the
           given filename in the Metalabel Trie.
        b. if not found, return error. (No such metalabel found in index)
           Else
               return the contents of the files-metalabeled subtrie.
```

Remove File from the Index

```
removefile(filename)
    1. Set Metalabelslist=listmetalabels(filename)
    2. While metalabelslist not empty repeat
        a. remove a metalabel from the list
        b. call removemetalabel(filename,metalabel)
```

Update Index for Copy File Command

```
copyfile(src,dest)
    1. Call removefile(dest).
    2. Set Metalabelslist=listmetalabels(src)
    3. While metalabelslist not empty repeat
        a. remove a metalabel from the list
        b. call addmetalabel(dest,metalabel)
```

Update Index for Move File Command

```
movefile(src,dest)
    1. Call copyfile(src,dest).
    2. Call removefile(src)
```

Search Files with the Metalabel

```
searchfiles(metalabelslist)
    1. for each metalabel-i element of metalabelslist
        a. get files-i=listfiles(metalabel-i)
        b. if files-i == empty
               return null
        c. sort files-i
    2. get fileslist by doing a "incremental intersection" of all files-i
    3. return fileslist
```

In another embodiment of this invention, the second trie, File-Trie, is replaced with a change in the basic file system. The directory of the Linux/Unix file system is modified to incorporate meta-information. An extra field is added in the structure corresponding to the directory class. This stores meta-information. Information about the amount of data is also stored and indirect addressing is applied at the end and a pointer to a file containing extra information is stored. The data blocks of the directory desirably points to the directory structure. The directory structure of the file system, Ext2 is:

```
struct EXT2_DIR_ENTRY {
    DWORD inode; /* Inode number */
    WORD rec_len; /* Directory entry length */
    BYTE name_len; /* Name length */
    BYTE file_type;   /*File type */
    char name[EXT2_NAME_LEN]; /* File name */
};
```

The directory entries are the array of struct EXT2_DIR_ENTRY. The size of the each structure is given by the rec_len.

inode:—The inode number of the entry.
    rec_len:—The length of the record.
    name_len:—The length of the name of the file.
    name:—The name of the file. The string is not NULL terminated.

The above entry is modified to include 2 more fields:

| | |
|---|---|
| WORD | metalabel_len; /* Length of the metalabel field */ |
| char | metalabels[ ]; /* The metalabels associated with this file */ |

Whenever the copy or move (rename) command is called, the "metalabels" structure corresponding to the files involved must also be updated. The get-metalabel, and set-metalabel commands, read/update the directory inode-structure. To convert the current file-system to the abstract-file-system of this invention, each directory in the current file system must be pre-processed to take care of the new fields.

The method of this invention is desirably performed by a data processing system. The steps the system user would take are the steps of entering the desired metalabels and entering the query. The system would desirably perform the steps of: providing the electronic file in a first hierarchical file structure; assigning the user-entered metalabel to the electronic file; organizing the electronic file into the second hierarchical file structure as a function of the metalabel; receiving a query from a user; searching the second hierarchical file structure as a function of the query; and/or returning to the user the electronic file(s) having the metalabel matching the query.

The method of this invention is desirably executed and implemented in a data processing system by software program code that is desirably stored on a computer-readable medium, such as a hard drive. In one embodiment of this invention, a computer-readable medium encoded with instructions for organizing a plurality of electronic files of a data processing system includes a first program code that, when executed by the system, establishes a first hierarchical file structure including the plurality of electronic files. As discussed above, each of the plurality of electronic files is identified by a filename and/or file path in the first hierarchical file structure.

A second program code establishes a second hierarchical file structure, and desirably a plurality of additional hierarchical file structures, including the plurality of electronic files, each of the plurality of electronic files identified by a user-defined metalabel in the second hierarchical file structure. The program codes operate simultaneously, and the first and second hierarchical file structures exist simultaneously in the data processing system for the plurality of electronic files. The medium also includes a third program code for searching the second hierarchical file structure according to a user entered query.

As discussed above, in one embodiment of this invention, the second program code establishes a second hierarchical file structure comprising a trie with a plurality of nodes. Each of the nodes of the trie corresponds to one of the user-defined metalabels, and each of the nodes comprising an internal trie structure of the electronic files that have a matching metalabel.

The present invention is described in further detail in connection with the algorithm described above and the following results on various sample metalabels and queries which illustrate or simulate various aspects involved in the practice of the invention. It is to be understood that all changes that come within the spirit of the invention are desired to be protected and thus the invention is not to be construed as limited by these examples.

Algorithms for two types of metalabel searches were implemented on a Linux system: one for an abstract file system with no hierarchical metalabels and the other with hierarchical metalabel, as described above. The file system was populated with 10K and 100K files in the two experiments. Each of these search mechanisms were implemented in two ways, one where the system loaded the search program at search time, and the other where a client-server model was developed and the search procedure was implemented as a daemon process. In the first approach, both the query and total execution time (data loading and query) are reported.

In the system with no hierarchical metalabels, the system was augmented with a suggestion mechanism, where the union of all metalabels that were present in the reported files, which matched the search (metalabels), was also reported. The tests included times taken for both kinds of this system.

In the hierarchical system, the suggestions are always included for further refinement of the search. The suggestions include metalabels which are possible predecessors or successors of the current metalabel provided at the search query.

The efficiency of the method is evident from the time required to execute the search. For a system with 100K files, typical queries would require milliseconds. Even if the reported abstract folders contained files on the order of tens of thousands, the time required is less than a few seconds. Naturally these times would improve with utilization of well-known techniques for client-server programming such as caching. Further improvements arise from replacing the second trie structure with the modified inode structure as described above. Note that all changes to the files and metalabels are immediately reflected in the system.

No Hierarchical Metalabels
All times in ms

| | | | Index File Size | | | |
|---|---|---|---|---|---|---|
| | | 10 k | | | 100 k | |
| | | | Query | | | |
| | Dad | Others | photo | Dad | others | photo |
| | | | Number of Files reported | | | |
| | 359 | 1258 | 420 | 14233 | 20132 | 16076 |
| Load | Query Time: | | | | | |
| at Search | With Suggestion- | 14 | 54 | 22 | 790 | 1206 | 892 |

-continued

| | Index File Size | | | | | |
|---|---|---|---|---|---|---|
| | 10 k | | | 100 k | | |
| | Query | | | | | |
| | Dad | Others | photo | Dad | others | photo |
| | Number of Files reported | | | | | |
| | 359 | 1258 | 420 | 14233 | 20132 | 16076 |
| (other applicable metalabels displayed) Without Suggestion Query Time + data loading | 7 | 28 | 9 | 330 | 586 | 485 |
| With Suggestion- (other applicable metalabels displayed) | 172 | 209 | 199 | 3236 | 3870 | 3634 |
| Without Suggestion Client-Server model: | 163 | 183 | 167 | 2930 | 3285 | 2952 |
| With Suggestion- (other applicable metalabel displayed) | 17 | 66 | 25 | 1284 | 2182 | 1813 |
| Without Suggestion | 9 | 33 | 16 | 363 | 605 | 505 |

Hierarchical Metalabels
All times in ms

| | | Index File Size | | | | | |
|---|---|---|---|---|---|---|---|
| | | 10 k | | | 100 k | | |
| | | Query | | | | | |
| | | dad/ | others/ | uncle/others | dad/ | others/ | uncle/video |
| | | Number of Files | | | | | |
| | | 359 | 0 | 60 | 2745 | 0 | 571 |
| Load at Search | Query time | 18 | 12 | 13 | 96 | 44 | 55 |
| | Query time + _Data loading | 179 | 167 | 165 | 2633 | 2533 | 2535 |
| | Client-Server model: | 32 | 24 | 25 | 145 | 89 | 99 |

Thus, the invention provides a method for improved file searching through implementation of additional hierarchical file structures that exist in the background of a data processing system alongside the traditional hierarchical directory tree file structure.

The method and apparatus of this invention can be expanded to include electronic files and/or websites of multiple users, such as across multiple server computers, aggregated in additional hierarchical file structures of this invention. For example, metalabels of a first user for files or websites on a first computer system can be organized with metalabels of a second user for files or websites on a second computer system. The additional hierarchical file structures of the multiple users' metalabels can be maintained and stored by a taxonomy handler on either or both of the first or second user, or on a third user's computer system. The multi-user hierarchy structure of this invention can be applied to unstructured user data as well as structured user data.

Figure 7:
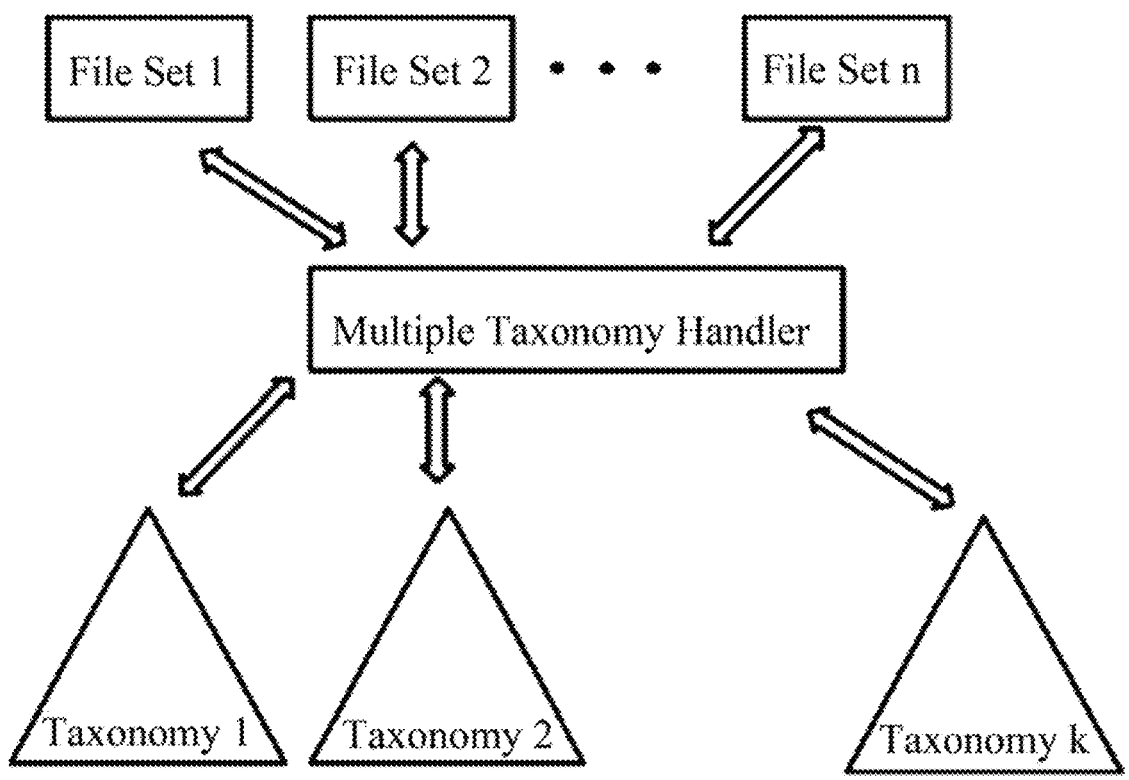
FIG. 7 illustrates a multi-user file structure according to one embodiment of this invention.

FIG. 7 illustrates a multi-user file structure according to one embodiment of this invention. A taxonomy handler, including a processor and database, aggregates metalabels of file sets 1, 2, . . . , n into multiple hierarchical file structures according to this invention. In one embodiment of this invention, each of the file sets 1, 2, . . . , n belongs to one of a plurality of users, such as each operating a separate computer system, and the taxonomy handler is operated by a third party remote from the users, and/or a logically separate computer. Each of the taxonomy hierarchical file structures is specified by a metalabel of the type A/B/C/ . . . /n, where A, B, C, etc. are individual metalabel identifiers. The multiple taxonomy structure is an aggregate of these structures, and can incorporate features of the invention discussed previously for additional hierarchical file structures.

In one embodiment, each of the metalabels in the multiple hierarchies (taxonomies) is associated with a file space identifier. Individual taxonomies can be stored on multiple systems and a union of the taxonomies is stored in the multiple taxonomy handler which aggregates multiple and overlapping taxonomies. While in traditional UNIX systems a hierarchical file space is constructed via nodes termed i-nodes, the system of embodiments of this invention maps the file-space identifier to a file/data location by an underlying file management system. The construction of a mapping between identifiers and the aggregate taxonomy can be achieved via database, a specific search structure like tries, or B-trees on an order encoded space.

The method and file structure of this invention can be further applied to the organization of web pages or members of web sites such as social networking sites. Current web-based "social networking" involves groups of people who share a common interest. Most social networking systems form groups, within a web site such as www.twitter.com or www.facebook.com, and a particular person may belong to a number of groups within those web sites. In one embodiment of this invention, the metalabels and hierarchical file structure of this invention can be used to provide an efficient methodology for organizing groups, thereby allowing users to exist in, organize, and efficiently and/or simultaneously participate in multiple groups.

The simultaneous membership in multiple groups is useful when a user's activities are common to a number of groups. As an example, consider a user Alice who has structured her set of groups into a hierarchy where the groups in the hierarchy could be categorized as A1/B1/C1, A1/B1/C2, A1/B2/C3, A1/B2/C4. A user Jane in Alice's group C1 may also occur in Alice's group C4. Alice may want to follow the conversations of Jane in both groups. This would be required with only one instantiation of Jane in her network. Jane can be advised of Alice's inclusion in a group, and in at least some implementations must agree to be part of both groups. It is also possible to limit Jane's interaction to one group. The data corresponding to a user could be real-time and/or may include cached or stored copies. The invention thus provides a hierarchical organization of groups with the power to simultaneously access data streams in multiple groups for efficient management of social groups.

Figure 8:
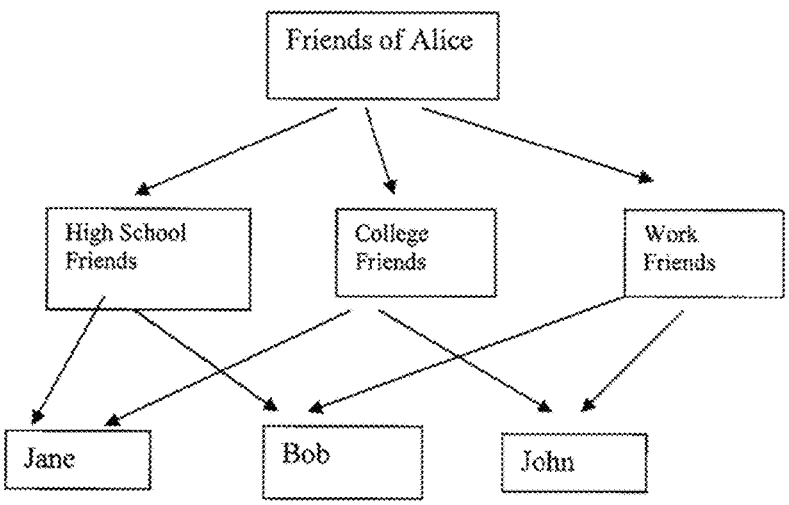
FIG. 8 illustrates a hypothetical social group structure.

FIG. 8 illustrates a hypothetical social group structure for explanation purposes. Alice would like to organize her social structure in the manner shown in FIG. 8. Alice can assign a metalabel of her creation for each of her friends who are also members of the social networking web site. As an example, Alice can assign the metalabels "high school" and "friends" to each of Jane and Bob, and "work" and "friends" to Bob and John. This metalabel is in addition to, i.e., does not replace, the web site user member identification name of Alice's metalabeled friends. The metalabels are also desirably abstract terms used to organize the metalabeled friends in the abstract hierarchical file structures of this invention. The metalabel is not replicated data, but a new identifier for each friend assigned by Alice. As noted in this example, more than one web site user can be assigned the same metalabel, thereby allowing for grouping according to the common metalabel.

Once the metalabels are created by Alice for her friends, a computer system automatically organizes and stores the user-defined metalabels in a hierarchical file structure. The computer system is desirably operated by the web site as a service to its users, but the hierarchical file structures of this invention could also be implemented on Alice's personal computer system or even through a third party web service. As discussed, the hierarchical file structure includes a trie, wherein a node in the trie that is identified with each metalabel is located or created. The computer system associates the corresponding web site member to the metalabel in the trie.

The stored links between the web site members and their corresponding metalabels organized and stored in the hierarchical file structure allow for quick searching of one or more members associated with a metalabel by searching for the metalabel. By searching for the metalabels, a user can quickly find other web site members associated with the metalabels, and optionally can automatically have a graphical user interface displayed with full or partial communications or other postings from the corresponding users.

In another embodiment of this invention, the metalabels and hierarchical file structure of this invention can be used to limit postings from one social group to that group and not to be seen, at least automatically or easily, by another established social group. A method of organizing and displaying web site member data streams in this fashion is possible via a multiple simultaneous metalabel tagging system of this invention. Referring again to FIG. 8, Alice can organize her online social structure so that Jane's conversations are followed by other high school friends and college friends but not by work friends. Additionally John's conversations are relevant to both work and college friends. By grouping the web site members that Alice is following, she can limit access to those groups to relevant web site members and keep other web site members who are following her from seeing communications or other postings from the grouped members.

Figure 9:
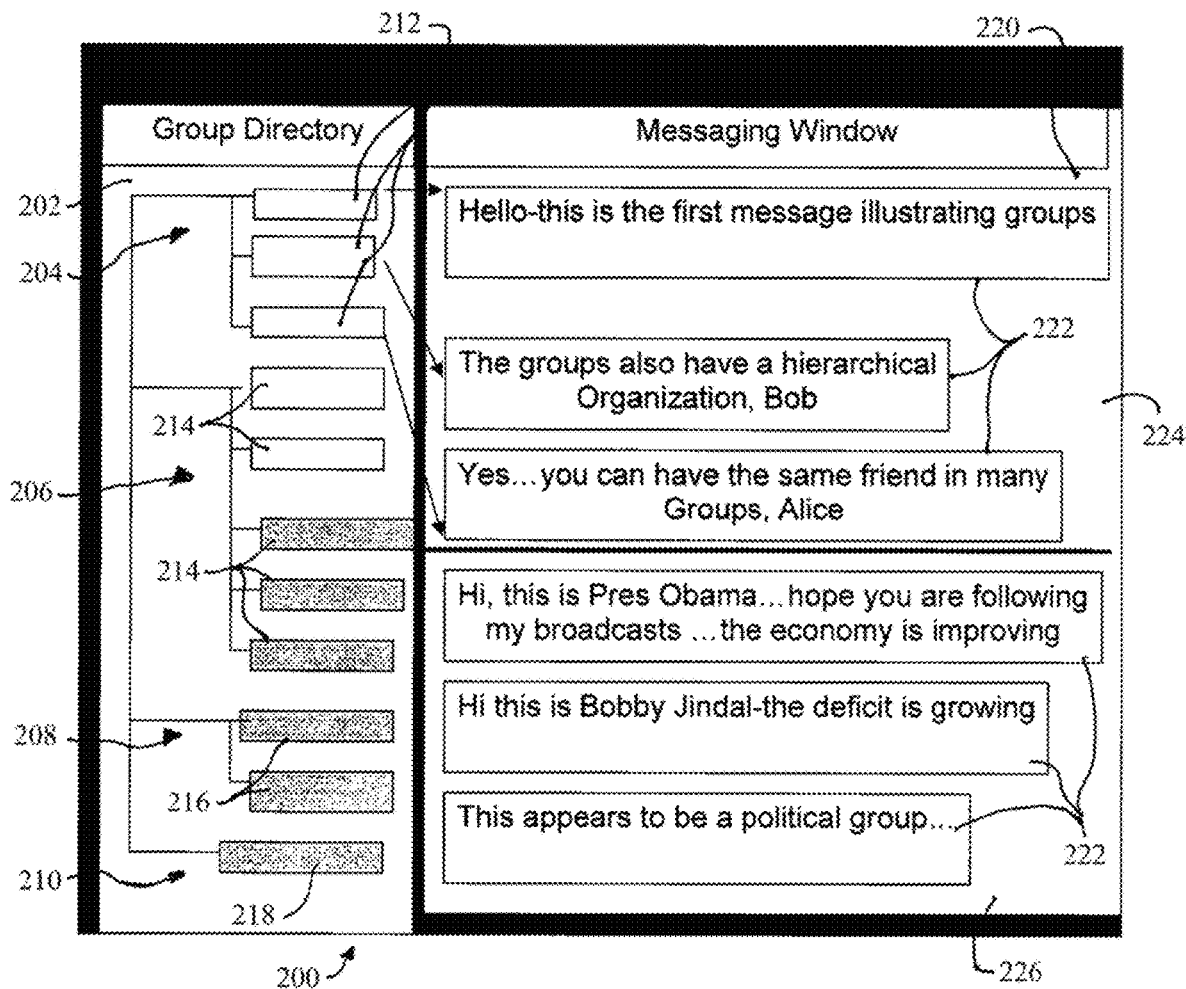
FIG. 9 illustrates an exemplary screen display of a graphical user interface according to one embodiment of this invention.

In one embodiment of this invention, a user's social groups that are established using the metalabels of this invention can be displayed to the user generating a graphical user interface (GUI) illustrating the groups or metalabels of the hierarchical file structure. FIG. 9 illustrates an exemplary illustration of screen display of a GUI 200 for displaying the metalabel groups of a user. The GUI 200 includes a group directory display 202 illustrating the groups 204, 206, 208, 210 and the group members 212, 214, 216, 218 within the groups, respectively. On the right side of the GUI 200 is messaging window 220 for displaying communications 222 from group members posted to the web site. In the embodiment shown in FIG. 9, the messaging window is divided into two portions 224 and 226. First portion 224 includes communications 222 from group 204, and the communications 222 in the second portion 226 are generated and viewed by group 206. While this particular GUI 200 shows messages to the user for two groups, the members of one group would not be able to view the messages unless those members were also in the other group. As will be appreciated, the configuration and content of the GUI can vary depending on need and the number of user-defined metalabel groups.

Figure 10:
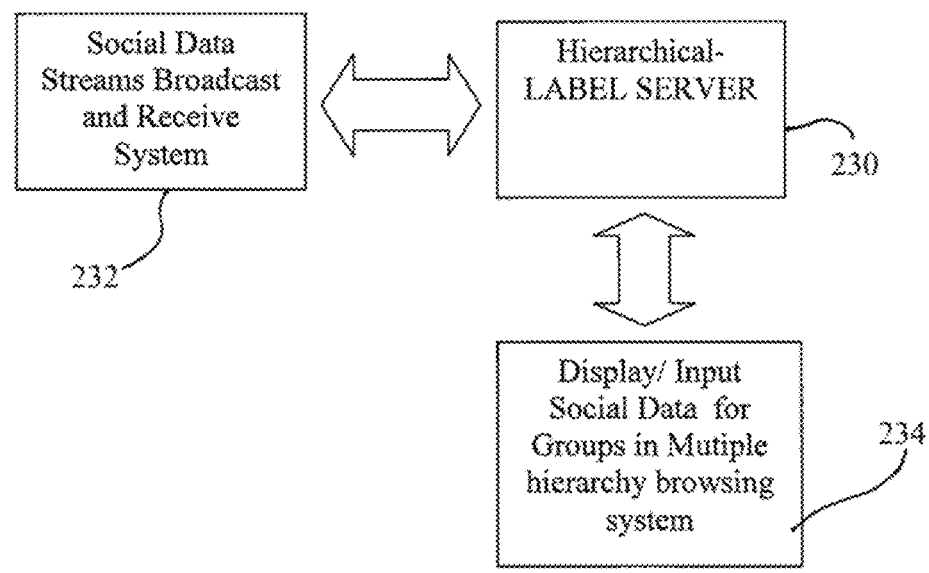
FIG. 10 is a general representation of an exemplary apparatus for implementing a metalabel system according to one embodiment of this invention.

An exemplary apparatus for implementing the above metalabel system is generally represented in FIG. 10. A label server 230 including or associated with a data processor and a database or recordable medium is used for receiving and storing user-defined metalabels for each of a plurality of web site members. The label server 230 includes software code stored on a recordable medium of the label server 230 and executable by the label server 230 for establishing and maintaining one or more hierarchical file structures. The label server 230 is in communication with a system for broadcasting and receiving data streams 232, such as those existing in current social networking sites. The label server 230 also includes software code stored on a recordable medium of the label server and executable by the label server for creating a graphical user interface for displays on a user interface of a client device. As an example, the label server 230 can include or be associated with a browser 234, which navigates the social groups and displays interactions in a trie-based hierarchical file structure according to this invention.

In another embodiment of this invention, the metalabels of this invention are applied to web pages themselves to be structured into multiple hierarchical file structures using the user-defined metalabels. Given the increasingly complex structure of local and Internet web-pages, web-pages can be viewed as a file system linked in a graph structure which corresponds to the possible access structure of the pages. This is inherently the only structure available in the architecture of web-pages. Visitors to a web-site are often faced with a myriad of web-page traversals to discover the page of interest. Information management and access thus appears to be a key issue in the "jungle" of web-pages.

Metalabel-based hierarchical data structures of this invention can be viewed by a browser system and provide alternate views of an interconnected set of web-pages that are typically found on the site of large organization. While searching for web-pages can be achieved via a search for relevant keywords, a structured view of the arrangement of web-pages has its own advantages. Often it would be easier to access structured and labeled data than search for a "needle in a haystack," which search engines are adept in doing. Consider a similar problem in the organization of files. File systems achieve a level of data organization by using a tree to provide a hierarchical and structured arrangement. Traditional file systems, including both UNIX and its variations (LINUX, etc.) and WINDOWS, have the most natural mechanism for organizing data: one hierarchical method of file organization, which is tree structured with directories and sub-directories.

This single method of organizing data leads to considerable inefficiencies in accessing files. This problem can be addressed by the additional abstract file system of this invention where hierarchical metalabels are introduced to specify multiple hierarchical organizations. The abstract file system of this invention can also be applied to web pages, which can be labeled manually or automatically by data processors, such as by a method of crawling the web-pages in a domain to extract terms as metalabels or collect the web-sites predefined metalabel data, and to provide a search/browse facility so as to enable the user to view/browse and access any indexed or labeled web-page.

Figure 11:
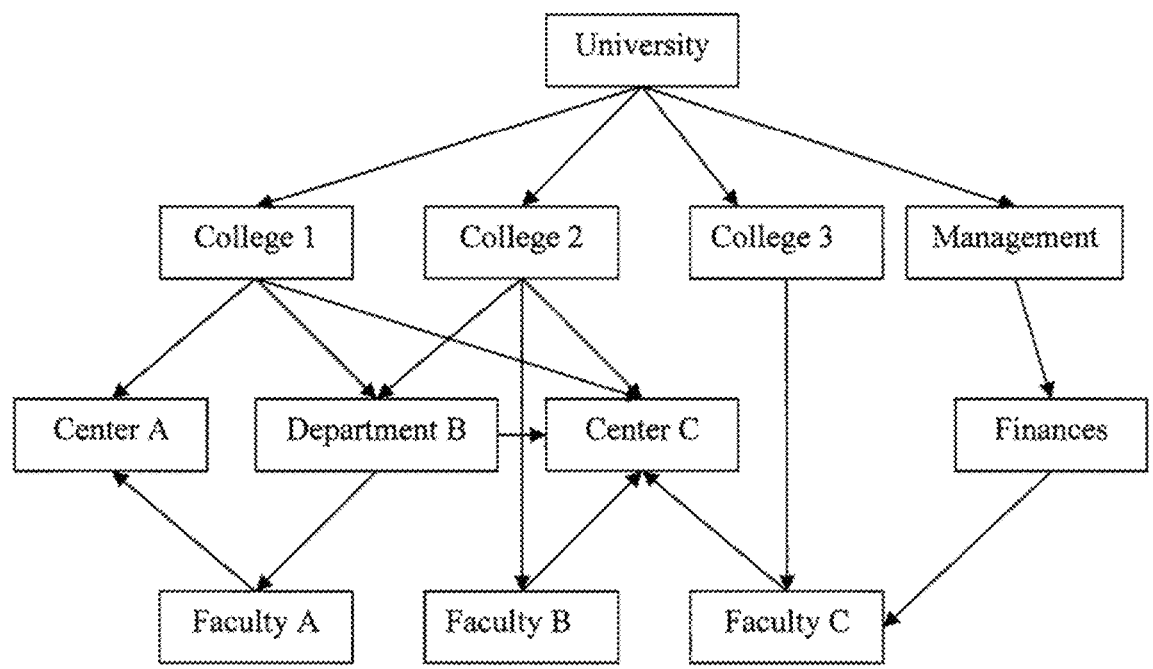
FIG. 11 illustrates a hypothetical University web-page structure.

FIG. 11 is provided as an exemplary structure of a University's web-pages for discussion purposes. Suppose an Internet user wanted to access information about Center A of the University. The web-design would require a number of link traversals, such as from a home page. If direct links from all pages to other pages are not provided, the task of page traversals becomes complicated and cumbersome. This motivates the creation of a page browser. The traditional browser however cannot represent the graph structure above. Instead, the metalabels and multiple hierarchical file structures of this invention can be used to label pages and provide a user-specified hierarchy that creates a page browsing system.

In one embodiment of this invention, a hierarchical web-page view (HWV) structure is provided. The HWV structure provides the facility to label web pages with metalabels which can be used to provide a hierarchical view of the structure of the web-pages. For example, assigning metalabel tags for the web pages in FIG. 11 could include:

University/College1/Department B/Faculty A
University/College2/Department B/Faculty A/Center A
University/College3/Faculty C
University/College3/Faculty C/Center C and would provide an abstract directory structure. In one embodiment of this invention, a folder view of all these pages would then be provided with abstract folders for University containing sub-folders for College1, College2, etc. along with links to the pages.

Figure 12:
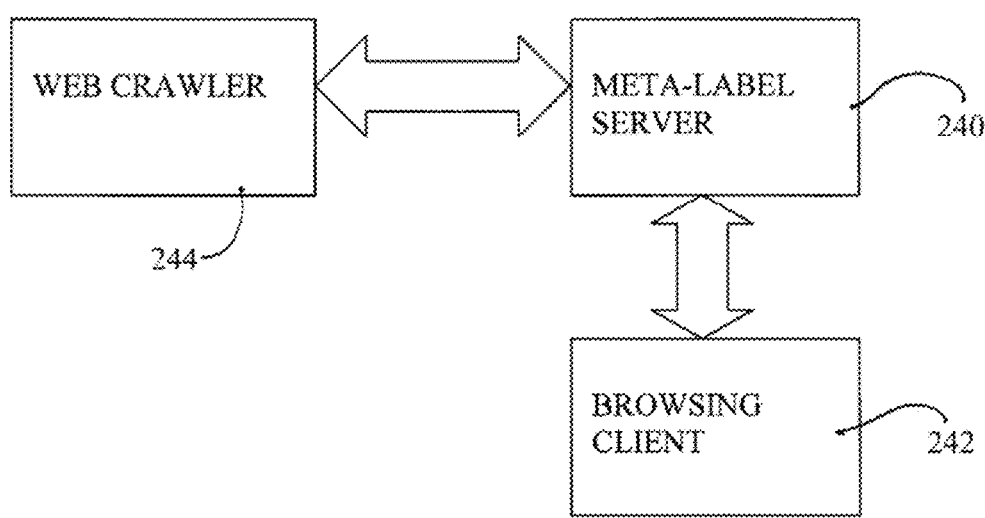
FIG. 12 is a general representation of an exemplary apparatus for implementing a metalabel system according to another embodiment of this invention.

An implementation architecture of HWV according to one embodiment of this invention includes a web-scan system, a hierarchical-label server, and a web-browser client. Referring to FIG. 12, the web-scan system comprises a label server 240 and a browser 242, such as described above. The web-scan system is embodied as a web-crawler 244 that provides for a periodic scan of all web-pages to access or create metalabel information. In one embodiment of this invention, the web-crawler 244 extracts text from web pages to automatically create metalabels. In another embodiment, web page owners or administrators can apply metalabels to their own web pages, and the web-crawler 244 can extract these metalabels when the web site it accessed. The metalabel information is collected and made accessible to the label server 240. The web crawler 244 provides a web-graph traversal system which will crawl the linked pages and extract from each page a hierarchical metalabel. The hierarchical metalabel will be embedded in the html-code with a distinguisher. This would be standard based and uniquely identifiable. The web-scan systems can be implemented as a standard graph search algorithm.

The label server 240 of one embodiment of this invention is a server for storing metalabels, methods and code for updating metalabels, including addition, deletion, and editing, and a search facility for web-pages corresponding to metalabels. The label server would interact with browser 242 as a Client-Server system. The label server 240 is implemented as a double-trie system, with two tries which would maintain a doubly-indexed database of web-pages and their corresponding metalabels. For each add, modify, and update metalabel tag command, the trie structures are suitably modified. The data modifications for the server are fed by either the web-browser or by an administrative client.

Browsing the web-pages is provided by a browser client 242. A link to activate the client 242 can be embedded into any web-page, typically the home page of the organization. This would activate client 242 which would then be able to extract metalabel hierarchical information from the server and display the structure of the web-pages. The user can access web-pages directly via links from the browser 242. Searching and browsing the multi-hierarchical labels would then be accomplished via standard browsing facilities of directory structures. The browsing client 242 can be implemented as a web-based GUI that provides a hierarchy browsing system similar to the Explorer system used in Windows and Linux graphical user interfaces.

Figure 13:
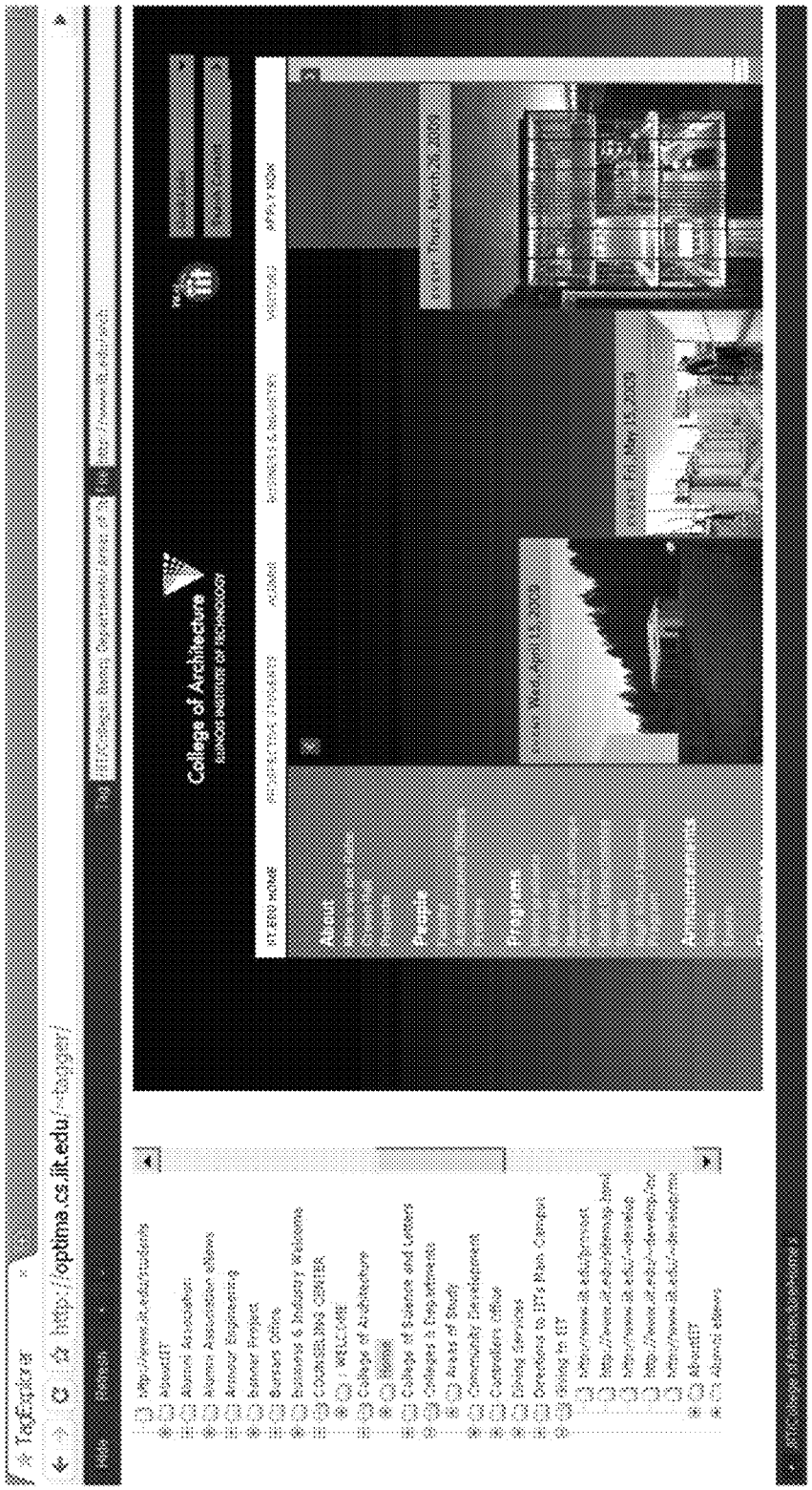
FIG. 13 is screen display of an implementation of a metalabel file structure for a web site according to one embodiment of this invention.

An administrative client would be a browser with additional features to allow for changing metalabels. To maintain consistency this would entail modifying web-pages automatically to update their meta-labels and administrative privileges would be required. Thus, the metalabel specification of the web-pages can be specified and edited from the page itself or via an administrative client. A screen display from an implementation of the system is illustrated in FIG. 13.

In a distributed system of metalabel tagging, multiple users may be allowed to tag multiple files together in the collaborative environment. Embodiments of this invention include a shared common store of the metalabels. This is achieved by a common server used to store the data and accessible by individual clients. In embodiments of this invention, one or more labels of one user may be shared with another user or other users. Each metalabel supports attributes as to author and other users, with permissions as to whether they may or may not be allowed to edit. A publicly available user is marked as such. Collaborative tagging can include statistics about tag usage. Metadata supported include, but are not limited to: the IP address of posting tagger, and/or a timestamp; access rights (read, write, authorize) of the individual, a group, and/or the world; a language of tag and/or a duration the tag will be retained, etc.

Further, this will useful in personalized tagging according to this invention, and discussed below, where each user can restrict subscription to tags, categorized as private or shared with others, or even with specific users.

Operating efficiency is important as mobile devices become the primary, daily use computing devices. Thus, there is a continuing need to implement this invention as efficiently as possible over a network and/or on lower connectivity/storage/power devices. In addition, personalization is a current trend in data management, and organizing or presenting data particularly relevant to a user is beneficial, such as again for limited capacity mobile devices.

This invention includes a personalization method that allows the data in the hierarchies to be additionally organized according to a user profile. The personalization is particularly useful when the data organized in the metalabel hierarchies of this invention are accessible by multiple individuals. The personalization allows for efficient access to relevant metalabels for a particular user, thereby reducing processing. The reduction of accessible metalabels by personalization is particularly useful for devices having limited capabilities, such as mobile devices. The personalization method of this invention can provide a shadow copy of the full metalabel hierarchies for implementation on any device where a threshold is needed, for example, a mobile device.

Embodiments of this invention include a computer-implemented method for organizing files, data items, web site members, or web pages according to user profiles. In one embodiment a first data processor automatically aggregates user-defined metalabels of a first user from a first plurality of electronic files, data items, web site members, or web pages into a first plurality of hierarchical structures, and automatically forms for the first user and/or for a second user a personalized second plurality of hierarchies from the user-defined metalabels of the first user as a function of a predetermined profile of the first user or the second user, respectively.

Each individual is represented by a profile. The profile is then used to provide or assign a personalized weighting for each metalabel tag within the multiple hierarchies according to this invention. The user profile can be associated with a device, such as a mobile device of limited connectivity, storage, and/or power, to filter and reduce the full hierarchies to more relevant, reduced hierarchies as a function of the user profile. The hierarchy personalization of this invention provides hierarchies of reduced size but higher relevance to a particular user.

The personalized hierarchy of this invention can be automatically formed by selecting from a first user's metalabels for the first user her/himself, such as to create a shadow copy for a first user's mobile device. The personalized hierarchy of this invention can also be formed by selecting from a first user's metalabels for electronic devices of one of more other persons. Metalabels of the first user are selected to be included in a second user's personalized hierarchy as a function of comparing a second user's predetermined profile to the first user's metalabels.

In one embodiment, a second user's personalized hierarchy includes metalabels shared by the first user. As mentioned before, in a distributed system of metalabel tagging, multiple users may be allowed to tag multiple files together in a collaborative environment.

The user profiles of this invention can be generated according to any suitable method, or a combination of generation methods. Exemplary user profile generation methods include a bag-of-words model (from personalized corpus, blogs, directories, contacts, etc.), a topic model (from personalized corpus, blogs, etc.), be learned online (such as from a searching of tags), and/or from prompting the user for initial creation (surveys, etc.). Other learning or mining approaches known in the art can likewise be used to create user profiles.

The user profile allows for personalized scores for weighting metalabel tags within the metalabel hierarchies of this invention. In one embodiment of this invention, each tag within the metalabel hierarchy has a weighted score for each user of the hierarchy. The weighted score allows the computer system to generate a personalized hierarchy, such as only including tags having at least a threshold weighting. The weighting can be used for devices where a limited hierarchy is needed, such as providing a shadow copy for a mobile device. Any suitable weighting scheme can be used to score metalabel tags of this invention. One exemplary weighting model is a naïve model that computes the inverse document frequency (idf) score for each word w in vocabulary $V_i$ in the profile of the individual i; such as $idf(w_i)$. For all individuals, all hierarchies, and any tag $t \varepsilon V_i$, assign that tag $idf(t_i)$. Tags can have different weights for differing hierarchies/individual combinations.

In embodiments of this invention, a threshold is established to determine which metalabel tags to include in the personalized hierarchy. The threshold can be a minimal weight threshold, such as by extracting the nodes that are weighted above a minimal weight threshold. The nodes can be determined, for example, by using any suitable search algorithm, such as a breadth-first search, a depth-first search, a greedy algorithm search, any search algorithm or search structure described herein, or combinations thereof. The threshold can be additionally or alternatively a predetermined number of nodes. The top weighted nodes up to a predetermined number can be selected, such as by using any suitable node selection algorithm. An ordered index of weights can also be used to reduce search time.

Creating the personalized hierarchies desirably maintains the original hierarchical structure. In embodiments of this invention, 'empty' placeholder nodes can be placed as needed for original hierarchy nodes not included in the personalized hierarchies. Compression of sub-tree structures representing empty placeholder nodes can be done to reduce the storage and efficiency of the structures.

The invention further includes search structures to improve the searching of the metalabel hierarchies according to this invention. There is a need to improve searching when a user only has a partial metalabel tag or otherwise does not know a full metalabel tag, which may be common in sharing another user's hierarchies as discussed above. Embodiments of this invention include a computer-implemented method for improving searching of metalabel hierarchies by automatically forming keywords from the metalabels. Each keyword is a string of at least two of the user-defined metalabels, or a portion thereof. The computer system then automatically forms a plurality of search structures with the keywords; the search structures exist simultaneously with the plurality of metalabel hierarchical structures.

Figure 14:
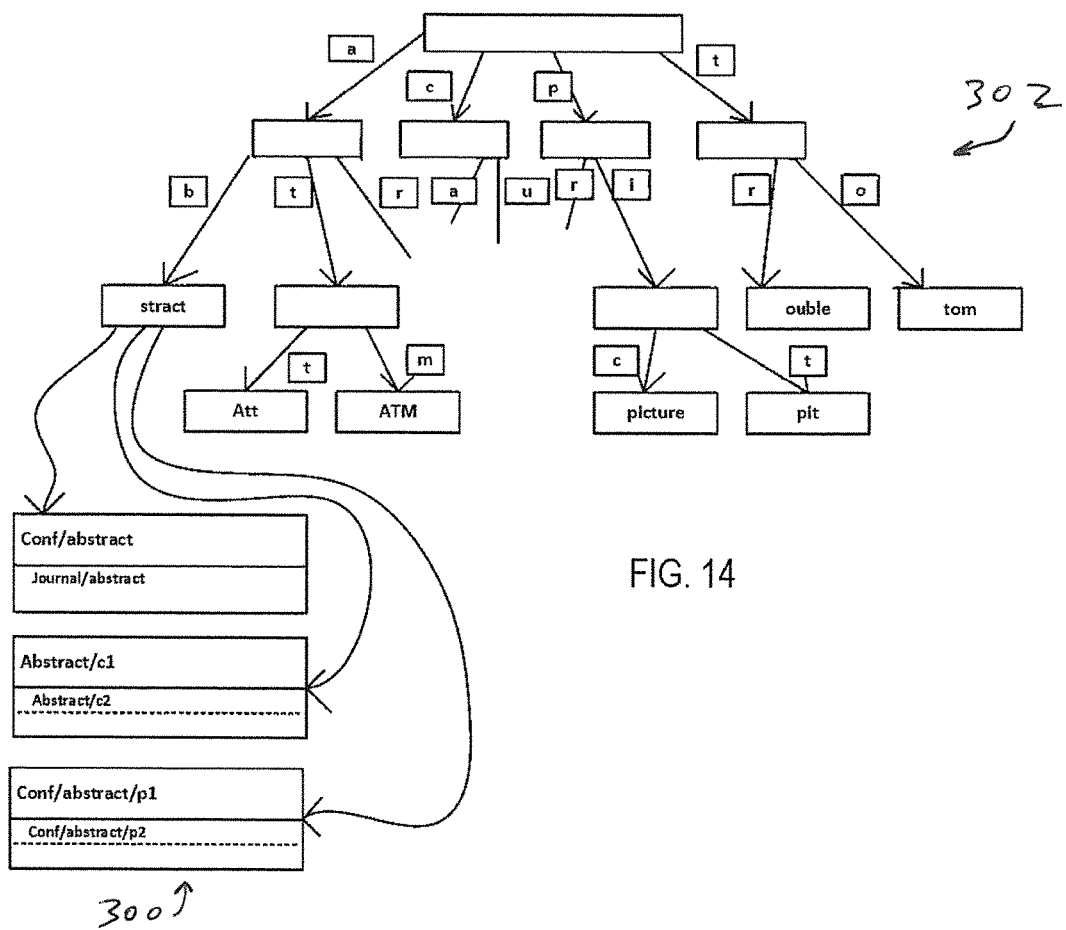
FIGS. 14-17 each show an exemplary search structure according to embodiments of this invention.

FIG. 14 illustrates a simple search structure 300 for metalabel hierarchy 302, according to one embodiment of this invention. The structure 300 allows searching by one term. The search term may be part of any of the metalabels used in the abstract hierarchy 302. The additional search structure 300 is established to search for the search terms, by creating a collection of keywords. Each keyword is a metalabel substring. For example from metalabel ABC/PQR/XYZ, the keywords could be ABC, PQR, XYZ, XY, AB, etc. The search structure 300 is established for these keywords. One exemplary structure is a relational database with query system. Another efficient structure is a trie. At each node of the trie metalabels containing the keyword are established as a prefix, postfix, or substring. These keyword nodes are stored as three different sets.

In one embodiment of this invention, the simple search structure is made more advanced by supporting the search via a Boolean expression for multiple terms combined using the logical "AND" and "OR" queries. The query can be specified as collection of two or more search terms, such as: (a) "ABC XY" would be an OR query and would return all metalabels (and associated data) that contain ABC or XY; and (b) "ABC+XY" would be an AND query. For an 'AND' keyword search, the returned collection of secondary keywords and files includes both keywords as part of any tag or two different tags.

A double search for keywords A+B can be performed, for example, using a relational search for A and a search for B, and filtering the results using 'AND'. Alternatively, the data structure can be enhanced for a double search.

Figure 15:
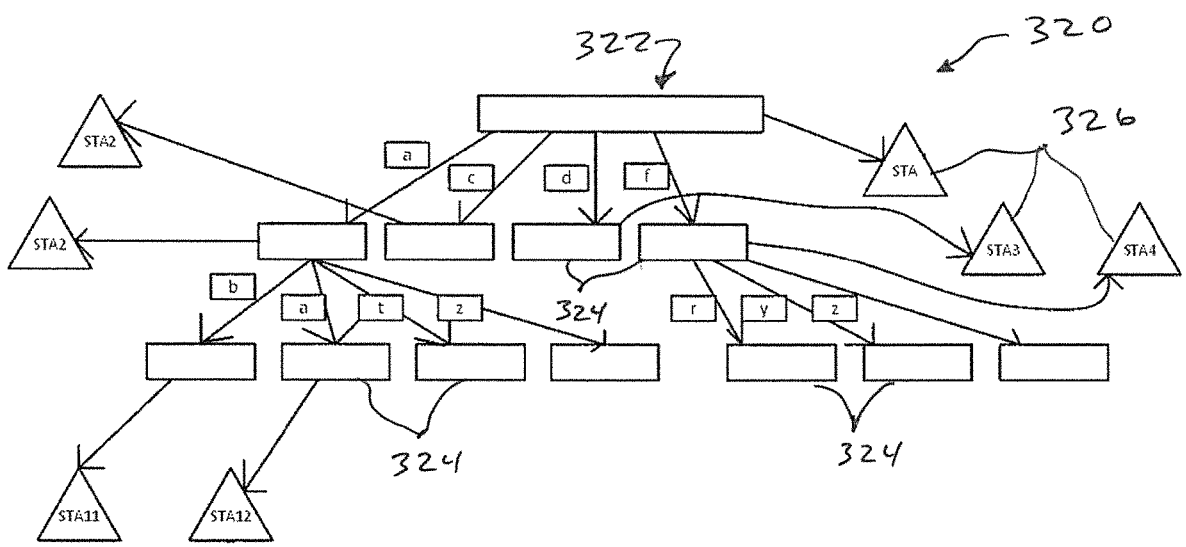

FIG. 15 illustrates a nested trie search structure 320. FIG. 15 illustrates a Patricia Trie data structure to accomplish the advanced searches, although other trie structures are possible as well. While OR queries can be performed by multiple simple queries and return a union of the results, FIG. 15 represents a more efficient structure for AND queries. The trie search structure 320 includes a primary trie structure 322 that supports the search for the first search term. At each node 324 of the primary structure 322, reached as a result of the search, there is a collection of metalabels that correspond to the primary search. The metalabels are stored in a secondary trie structure 326, each similar to the structure of FIG. 14, that is used to search the second term. The advantage is that now the secondary search is over a limited set of metalabels, thus making the search more efficient. Tertiary structures, and additionally more structures, can be added to allow for more search terms in the AND query.

Wildcard searches generate a tree of searches and thus provide additional difficulties. As used herein, a wildcard search is a search that includes a special character, such as "$" or "?", that can be substituted by any one character or a "*" that can be substituted by an arbitrary long string, including the null, at, for example, the end of the term. Wildcard searches can be performed on databases using a regular expression search. In embodiments of this invention, wildcard searches are performed using a method incorporating tries.

Figure 16:
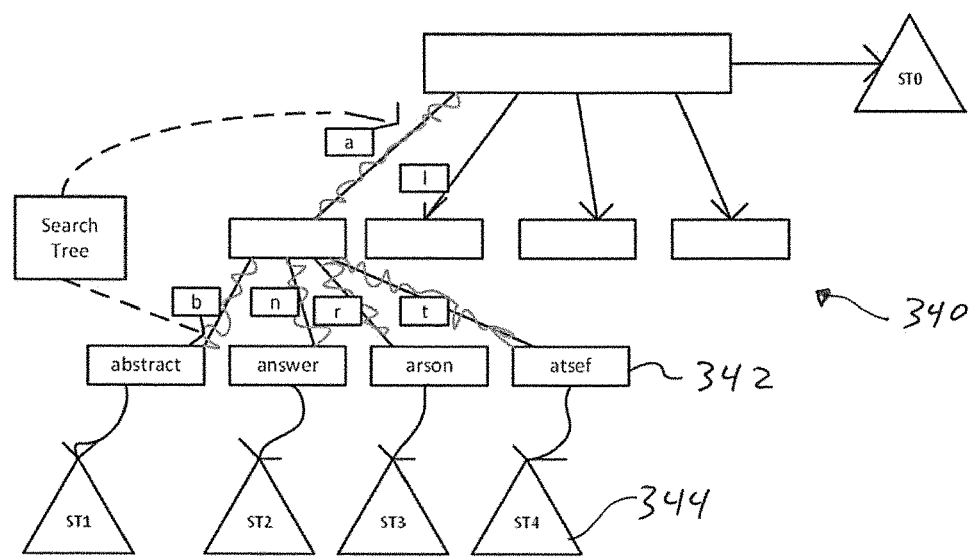

In preferred embodiments of this invention, wildcard searches are performed using trie-based data structures as shown in FIG. 16. Wildcard searches typically generate a tree of searches in a trie data structure, as shown for the exemplary search "a?s*" in FIG. 16. The character "?" or "$" is replaced by all the possibilities giving rise to a search inside the primary trie 340 that corresponds to a sub-tree. All the metalabels that arise at the leaves of the sub-tree need to be reported. A leaf node 342 is the end point of the sub-tree. A sub-tree is generated at the primary trie 340, where an in-order traversal of the sub-tree contains all the results that match the primary keyword. In FIG. 16, the sub-tree is indicated by the lines marked with the squiggle.

As also shown in FIG. 16, secondary structures 344, as described above for FIGS. 14 and 15, can optionally provide for more advanced searches. Advanced searching can be further improved by linking results between parent and child nodes.

Advanced searches may involve two or more query terms each containing wildcard terms. As illustrated above, these can be handled by a multi-dimensional search. However an advanced search, such as the AND query, includes a first search term that generates a sub-tree, and at each node of this sub-tree, there is an additional search structure for the second search term. As before, similar additional structures can be added for additional search terms, with each dimension represented by a tree. The search tree generated as a sub-tree of the primary tree has the results of the search using the first term at the leaves. Let L1 be the leaf nodes in the search sub-tree S in the primary structure. The secondary trees stored at nodes of L1, termed ST1, ST2, ST3, ST4 will then be searched for the second search term. This will generate a search sub-tree in the secondary tree to allow for wildcard search terms. The set of leaves, L2, at the second search sub-tree will be used to report all the metalabels (and associated data) that correspond to the advanced search. The advantage of this structure is that search is now restricted instead of searching for both terms independently and then finding common terms. This improves the efficiency of the search.

Figure 17:
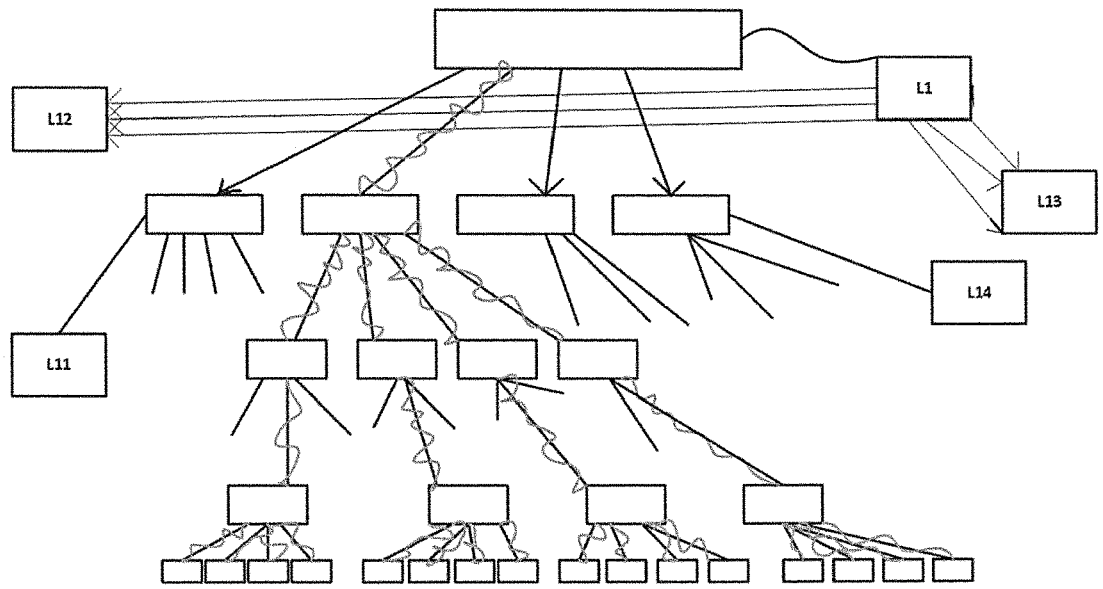

In the above approach, to search the secondary structure at L1, the method searches all of the search structures at the leaf nodes in L1. However, note that in the primary tree structure, the set of secondary keywords at a node V also occur in an entirety in the secondary keywords at the parent of V. Thus, a search inside the secondary structure at node U in the primary tree can be used at the child nodes of U. This requires a pointer from each node in the secondary structure at U to the corresponding node, if it exists, in the secondary structures at each child node of U. This is illustrated in FIG. 17 where there are pointers (arrows in FIG. 17) from nodes at L1 to the corresponding nodes in L11, L12, L13, and L14. As seen, in the illustrated example, L1 has corresponding nodes in only L12 and L13 and not in L11 and L14. If the results of the search are of substantial amount, these pointers can be followed to save repeated searches, as only one search needs to be performed at the secondary structure of the primary tree's root node.

In embodiments of this invention, fractional cascading searches are used to expedite queries by querying once at the root of the tree and not repeating the search at subsequent nodes (FIG. 17). This technique requires a link from an item in a list of items at the parent to the corresponding closest item at the child.

As discussed above, the abstract data organization system of this invention provides a user with a method to define multiple hierarchical structures for storing data. The multiple hierarchies provide for fast search. In embodiments of this invention, the hierarchies and searching are further improved via the use of preference weights, allowing data to be organized effectively based on efficacy and reported using that efficacy. The weighting provides for filtering search data based upon relevance and improves ranking of data for users.

Embodiments of this invention include automatically weighting each of the user-defined metalabels as a function of relevance. The invention enhances the taxonomy structure defined via hierarchical tagging to incorporate relevance rankings. The hierarchical metalabel structures are enhanced with preference ranking so as to organize and search tagged data efficiently.

Consider the example of medical journal documents that are tagged with the multiple hierarchical tagging as below:
Coronary/Diabetes/JournalPaper1(8.2)
Coronary/Diabetes/JournalPaper2(7.2)
Coronary/Diabetes/JournalPaper3(6.1)
Diabetes/Hypertension/Coronary/JournalPaper1(6.2)
Diabetes/Hypertension/Coronary/JournalPaper4(7.3)
Diabetes/Hypertension/Coronary/JournalPaper3(5.2)
A relevance weighting for each of the journal papers above is represented in parentheses. The weighting can be established by any suitable relevancy ranking methodology and is desirably obtained by comparing terms within the metalabel to the journal paper (or other corresponding one of the plurality of electronic files, data items, web site members, or web pages). One method of extracting the weighting could be based on a term-document frequency index which would be based on the frequency of the term and synonyms in the document. As seen in the example above, the weights on the papers are a function of the hierarchy, and two different metalabels for the same paper (e.g., Papers 1 and 3) can have a different relevancy weighting. This is due to the hierarchy path, namely the order of the individual metalabel terms, and their relevance to the corresponding papers. For example, for JournalPaper1, the term "Coronary" is more relevant to the paper than the term "Diabetes" (e.g., the paper is primarily about heart health). Thus the metalabel having the term "Coronary" first in the hierarchy has a higher weighting under the applied weighting because the metalabel is a more relevant metalabel to the corresponding paper.

The relevancy weighting or ranking is particularly useful for displaying metalabels and/or searching. In embodiments of this invention, the system receives a search query with metalabel terms and a relevancy value, and searches for user-defined metalabels matching the search query and having a weighting satisfying or matching the received relevancy value. The weighting can also be used to order a display of metalabels as a function of relevancy values, such as the search results and/or for displaying the metalabels on a graphical user interface.

Using the example above, searching for all papers with relevance score of 7.0 and above yields the following results:
Coronary/Diabetes/JournalPaper1(8.2)
Coronary/Diabetes/JournalPaper2(7.2)
Diabetes/Hypertension/Coronary/JournalPaper4(7.3).
A search for all such papers that relate to the primary keyword "Diabetes" will yield:
Diabetes/Hypertension/Coronary/JournalPaper4(7.3).

In other embodiments, topic relevance of the metalabel terms is considered to the corresponding files, data items, web site members, or web pages. In this approach, more than one, or all, of the keywords in the hierarchy can have a weight that allows for construction of an ordered hierarchy. As a non-limiting example, consider the following weights on the labels in the hierarchy:

Diabetes/Hypertension(8.4)/Coronary/JournalPaper1 (7.5)
Diabetes/Coronary(7.2)/JournalPaper4 (8.3)
Diabetes/Neurology(8.8)/Coronary/JournalPaper3(9.2).
A search for labels with threshold weight 7.5 or more yields the following files (where the individual weights are used for thresholds):
Diabetes/Hypertension(8.4)/Coronary/JournalPaper1 (7.5)
Diabetes/Neurology(8.8)/Coronary/JournalPaper3(9.2).
While a search on the above with a threshold 8.0 yields the result:
Diabetes/Neurology(8.8)/Coronary/JournalPaper3(9.2).

The metric used for determining the weight of a file can vary. In the above example, the metric was Min (weights of labels in the hierarchical meta-label). However, a function $f(x_1, x_2, \ldots x_n)$ was included, where $x_i$ are metalabels or labels, and f is a function defined over these metalabels. Non-limiting examples of such a function include but are not limited to:
(i) A specific metalabel being a particular string;
(ii) A specific metalabel having a threshold greater than or equal to a specified amount; and/or
(iii) A combination of meta-labels having a specific threshold.
Other Non-limiting examples of evaluation functions include:
(i) Max(weights of labels in the hierarchical meta-label);
(ii) Weighted average of labels in the meta-label; and/or
(iii) Normalized product of weights.

A logical combination of such functions, including combinational logic using operators AND, OR, and NOT can be used as well as first order logic. A non-limiting example of a first order logic includes: "Report data items where there 'exists' a label with threshold greater than a specified amount." In the above example, using the same metric, a search on a label threshold of 7.3 and a threshold of 8.0 yields:
Diabetes/Neurology(8.8)/Coronary/JournalPaper3(9.2)
Multiple label thresholds can also be searched. Consider the modified example as follows:
Diabetes/Hypertension(8.4)/Coronary(8.1)/JournalPaper1(7.5)
Diabetes/Coronary(7.2)/JournalPaper4(8.3)
Diabetes/Neurology(8.8)/Coronary(7.4)/JournalPaper3 (9.2)
A label search for more than one threshold above 8.0 yields:
Diabetes/Hypertension(8.4)/Coronary(8.1)/JournalPaper1(7.5)
In this example, the metric considers a count of the number of thresholds that meet the criteria, i.e., more than one. As such, the weighting allows for flexibility in searching and improved more relevant search results.

The invention further includes browsing via weighted metalabels. To browse, the weights on the labels can be utilized for a linear ordering of the files, so as to order the browsing experience. The weights may be used in lexicographic fashion or based on weighted average, or any other function that can be devised for assigning a combination weight for the metalabel.

The weighting can be static, but is preferably dynamic. As a non-limiting example, the relevance of a document may change as a function of time based on additional information available. This could include usage based on dynamically changing weights, an example being the frequency of access by the user.

In hierarchically organized data, arranged into simultaneous multiple hierarchies, the metalabels establish relationship or proximity of documents. However, a particular data or document may occur in multiple locations, identified by multiple metalabels. The user would like to search for data files in the most appropriate context of its location in the hierarchical organization.

As an example, consider a file related to a car part, with search term T="part=nut." This part is used in multiple cars and the file/data related to this part can reside in multiple locations in the simultaneous multiple hierarchies. However the most frequent use of this document, due to, for example, access patterns, positions the files in the hierarchy path CarH/ModelX/Design/PartA. Related search documents also occur in CarI/ModelY/Design/PartC, or CarJ/ModelZ/Design/PartC etc.

Each of the above paths in the simultaneous multiple hierarchies reference multiple data/files that are contextually related to the search term. Thus, it is important to the user to be able to not only locate the data corresponding to T but also associate files relevant to the path, e.g., files on the path CarH/ModelX/Design/*.

This provides for context searches that can be extremely relevant. As an example, note that while documents matching the search term may not have been accessed recently from that directory, the usage pattern indicates that the user has been currently accessing related files in that directory. Thus the access pattern of a file with metalabel CarH/ModelX/Design would indicate that documents in PartC should be reported in this context.

Embodiments of this invention include context sensitive metalabel ranking, i.e., the search results include a ranking of metalabels, wherein on a search term specified by a user, the most likely accessible set of documents are presented first, followed by the next set of documents, etc. An advantage of this approach is that it provides document clustering (related to search term) guided by metalabels, and thus, provides ease of use.

Embodiments of this invention include a method of determining a term-metalabel importance metric. In some embodiments of this invention, a static term-metalabel matrix identifies the frequency of a term (a term is, say, a word used in the data/document) associated with the children metalabel nodes. In one embodiment, this term-metalabel vector can be computed recursively from the children nodes by a weighted sum of term frequencies at each child node. For example, TF(t,L) is the term frequency of term t associated with metalabel L. Let L1, L2 . . . Ln be the metalabels at the child nodes of the node corresponding to label L. Then TF(t,L)=TF(t,L1)+TF(t,L2)+ . . . TF(t,Ln). If the term is not present at the data items in the subtree rooted at a node, say corresponding to metalabel L2, then T(t,L2)=0. At the leaf node, this vector can be obtained from the term frequency in the document collection. Each document d has TF(t,d) associated with it. Other parameters that could be used include number of data items that contain the term, etc. This parameter can change as the data changes. This can provide the basis for a metric B(t,L) where t is the term and L the metalabel. In some embodiments, this is computed as a tf-idf computation from the term-metalabel matrix.

In additional or alternative embodiments, a dynamic weighting of the metalabel identifies the dynamic or access importance of the metalabel with regards to the term. This can be embodied as an importance vector at each metalabel node, providing the importance of the (term,node) pair. In some embodiments, this is determined by the frequency of access of data with the metalabel and containing the term, weighted by, for example, a metalabel weight.

The metalabel weight can be the frequency of access of the metalabel. For example, the leaf nodes record the frequency with which the (term, data) pair is accessed when the term is searched to establish the weights at the leaf nodes for the recursive computation. The importance vector at each node can be computed from the child nodes by creating a term set as the union of term sets at the child nodes, and adding the frequency of access of each term over the child nodes. This is a dynamic parameter that can change with time as the data are accessed. The importance vector can also incorporate elements of the data collection that include number of data paths to the term, etc. The importance vector provides A(t,L) for term t and metalabel L. The term-metalabel(t,l) importance metric I(t,L) can now be computed from the above static and dynamic metrics as a product, A(t,L)*B(t,L).

Figure 18:
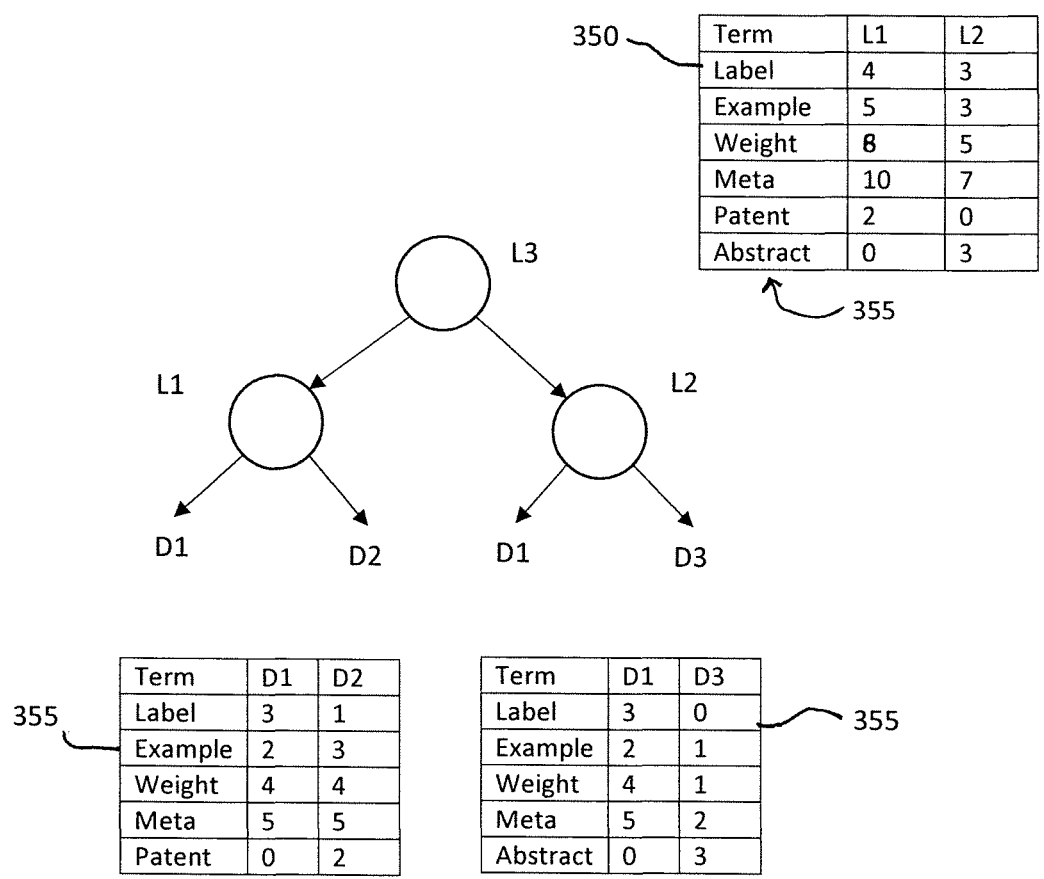
FIG. 18 illustrates static metalabel weighting matrices, according to embodiments of this invention.

FIG. 18 illustrates a dynamic metric weighting or ranking according to one embodiment of this invention. In FIG. 18, each node L1-L3 includes a static matrix 350 of searchable terms in the documents D1-D3, respectively. The searchable terms 355 can be any number of terms, identified by methods known in the art, such as but not limited to stop word removal, namely after removing common stop words like "a" or "the." The internal or parent node L3 includes a combined matrix of child nodes L1-L2.

Figure 19:
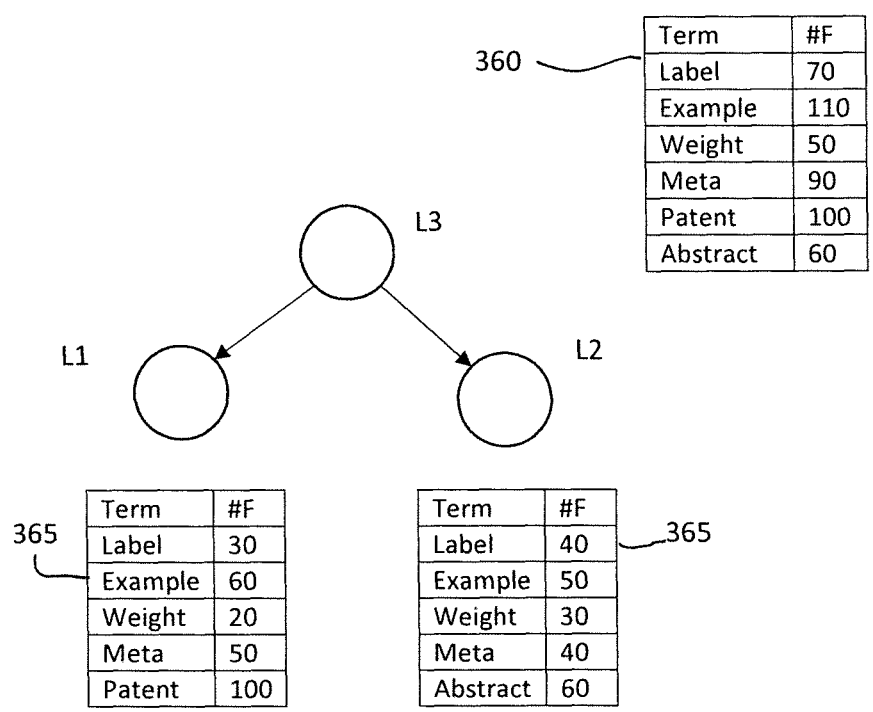
FIG. 19 illustrates dynamic frequency weighting matrices, according to embodiments of this invention.

FIG. 19 illustrates a dynamic metric weighting or ranking according to one embodiment of this invention. A dynamic importance vector #F represents user metalabel access frequency, or the number of times a document (or other item) within the subtree is accessed using the corresponding term. Again, the internal or parent node L3 includes a combined matrix 360 of matrices 365 for child nodes L1-L2.

Given a search term at the root, or at any node (e.g., "V"), the metalabel priority search can proceed as follows:
 a. Identify the children at the node that contain the term(s).
 b. Assign a ranking to the children based on, Wsearch(V T)=I(t,L), where V is the hierarchical tree node associated with the metalabel L. For multiple terms this can be summed over all the terms.
 c. Recursively explore the children in order of their ranking.
 d. Report the metalabel at the leaf nodes of the data organization and the corresponding data during recursion.

Figure 20:
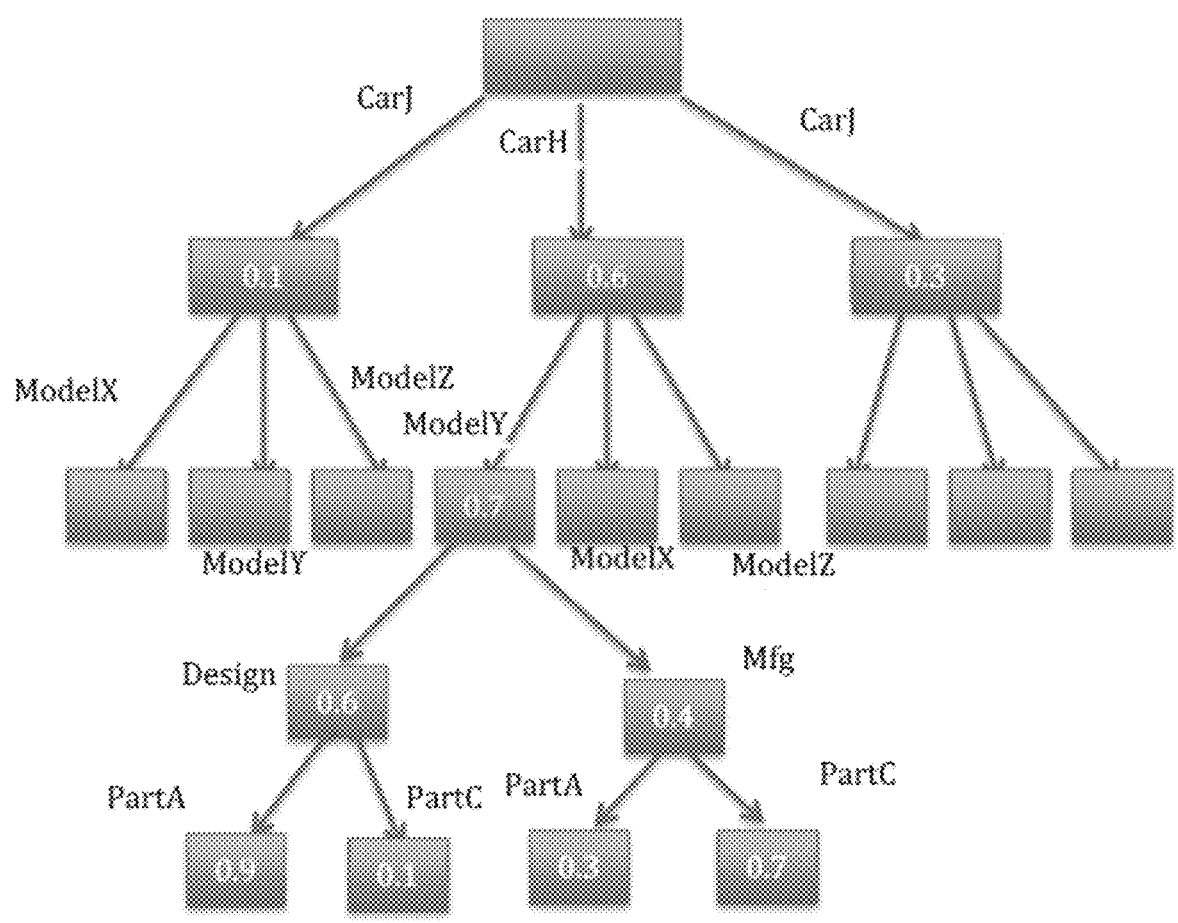
FIG. 20 illustrates a search structure according to one embodiment of this invention.
Figure 21:
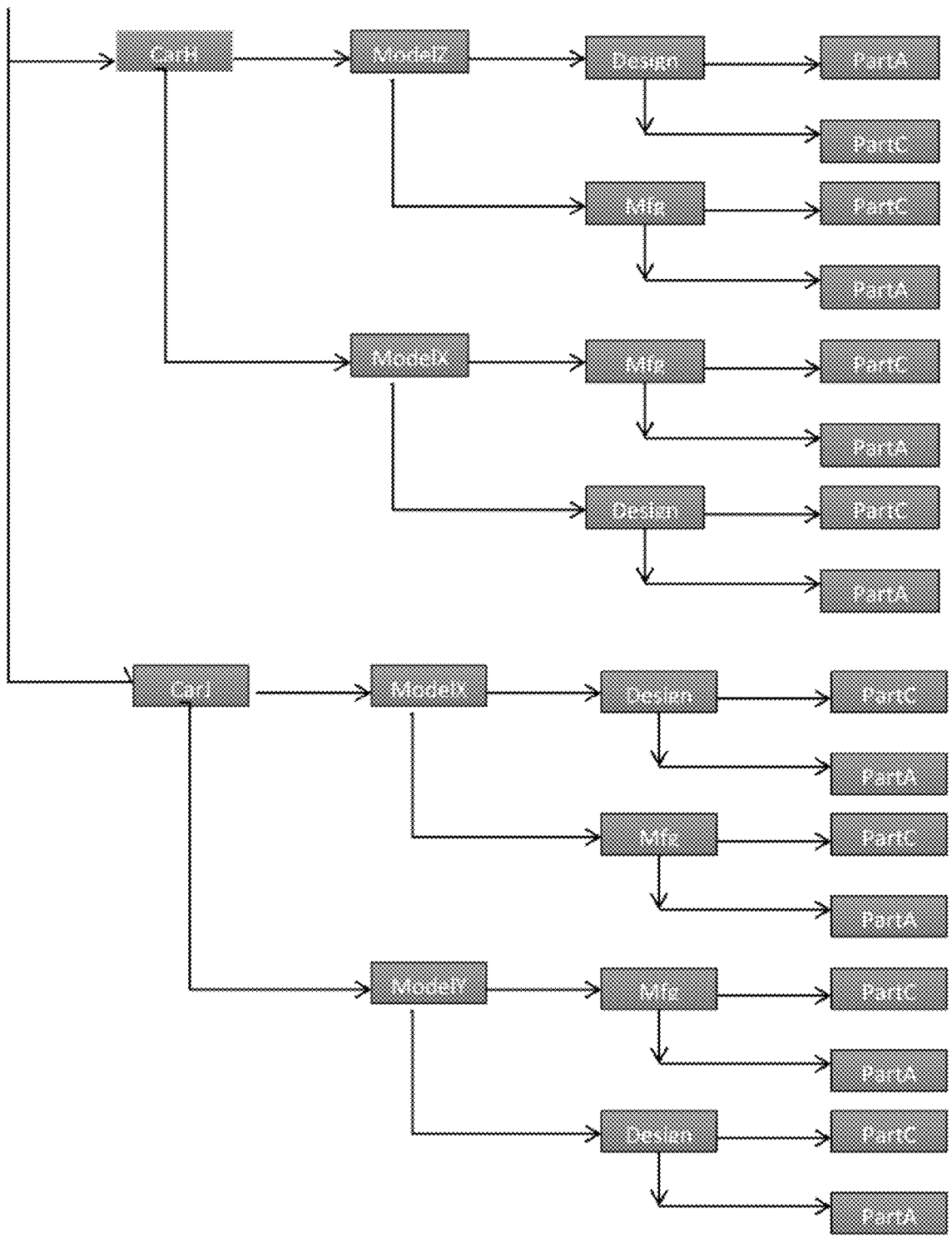
FIG. 21 illustrates a lexicographic search result according to one embodiment of this invention.

This provides a lexicographic ordering of the files containing the search terms, the lexicographic ordering based on the weights of the metalabels. It is termed lexicographic since the metalabels will be arranged in order of weight at each level of a hierarchical tree representation. As an example, if A1/B1/C1, A1/B2/C3, A2/B2/C2, and A3/B3/C3 are metalabels with the weight of A1 more than that of A2 and A3, then all metalabels that are extensions of A1 will occur before those that begin with A2, etc. This ordering is repeated at the next level also. So A1/B1/C1 will occur before A1/B2/C3 if B1 has larger weight than B2 (even if C3 has weight more than C1). For example, in FIGS. 20-21, searching for a term T (part=nutA), the computed weighting of each of the children is obtained as shown. The path CarH/ModelX/Design/PartA is explored first as CarH has the greatest weight Wsearch (V,T="part=nutA"), followed by ModelZ and Design, PartA. Since the search uses a recursive approach the listing is in the order:
 CarH/ModelZ/Design/PartA
 CarH/ModelZ/Design/PartC
 CarH/ModelZ/Mfg/PartC
 CarH/ModelZ/Mfg/PartA
 CarH/ModelX/Mfg/PartC
 CarH/ModelX/Mfg/PartA CarH/ModelX/Design/PartA
CarH/ModelX/Design/PartC
CarJ/ModelZ/Design/PartA . . .

In additional or alternative embodiments, ranking methods include preforming a breadth first search, or any other method, and identify children into a sorted structure, ranked by the value of the weight achieved at the leaf of the metalabel hierarchy tree. This weight can be a function of the weights along the search path. In some embodiments, this weight can be the sum of the weights of the nodes along the search path. Alternatively it could be the product of the weights along the search path.

Data can be reported in multiple ways. The hierarchy of metalabels can be reported as a primary method of ranking, which may lead to reporting the same file in multiple locations. Reporting the data without repetitions can be obtained using a second hierarchy, e.g., by reporting the metalabels associated with the data in a secondary fashion. In such embodiments, the unique files/data can be listed (ranked) along with a hierarchy of metalabels arranged in either lexicographic ordering or sorted using weights as above. This may require a ranking of the unique files associated with the search term. The data related to the search term can be ranked using multiple methods. In one method the ranking utilizes a function f(w1, w2 . . . wm) where there are m occurrences of the term with weights w1, w2 etc. in m locations in the metalabel hierarchy. The weight function can be computed as Tf*Weight(L) where L is the leaf node containing the data. The following function are examples (i) Max(w1, w2 . . . wm) or (ii) Sum(w1,w2 . . . , wm).

An additional embodiment of this invention, either independent or in combination with any of the embodiments (e.g., weighting) above, automatically embeds an n-dimensional range structure within the metalabel hierarchies. The n-dimensional range structure can include at least one of coordinates or dimensions, such as to give the hierarchical metalabels a geographic context. In embodiments of this invention, the range includes a minimum or maximum value, and provides for searching for user-defined metalabels matching a search query with metalabel terms and dimensional values. As discussed above, the embedded hierarchies are also implemented by encoded software instructions executable by a data processor.

As an example, consider a drone system, used for photography or surveillance, for classifying the terrain. Every object in the terrain can be classified by its coordinates as well as by its recognizable features. There are thus location parameters <loc> where loc=(x,y,z) as well as feature parameters specified in the set {<par1>, <par2> . . . <par k>} where <par m> is the value of <feature m>.

Each of these features, as well as the location parameters, can be used to further define corresponding metalabels. Metalabels composed from these parameters can be used to identify objects during the flight path of drones and allow terrains to be classified. A search on the feature space allows identification of locations and/or allows for extraction of features based on the location parameters. Weights on the feature space indicate the importance of the object. Geographic tagging according to this invention has applications to, for example, GIS as well as path planning for drones or other manned/unmanned flights.

Geometric range searches can be used when there are k dimensions or generally speaking, attributes. Examples of these attributes are height, width, length, latitude, longitude etc. These searches can be merged into a hierarchy of this invention, such as a trie for keyword search by embedding range search trees at the nodes of the hierarchy when searching over the attributes. Embodiments of this invention thus include a data structure that is a combination of geometric search and a string search mechanism.

Figure 22:
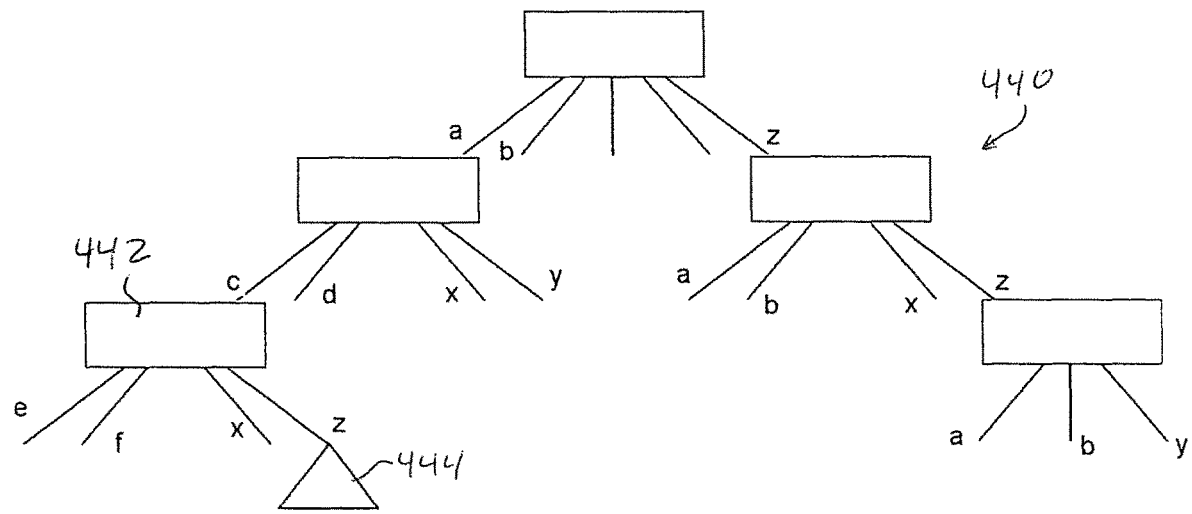
FIG. 22 shows an exemplary trie with an embedded 3-D range structure, according to one embodiment of this invention.

FIG. 22 shows, as an example, a trie 440 with an embedded 3-D range structure 444 at node 442. The 3-D range search in conjunction with search over strings illustrated in FIG. 22 is one example of a conjunctive data structure according to embodiments of this invention. The data structure provides for searching when the geometric data are presented as one 3-dimensional parameter. Thus, for example, data that are classified by <Typeof Structure>/<ConstructionMaterial>/<Size_parameters> can be searched.

As an example consider building data classified as

Bridge/Cement/A1(height=100ft,length=200ft, width=50ft)
Building/Steel/B1( height=150ft,length=80ft,width=50ft)
Building/Wood/B2( height=50ft,length=50ft,width=40ft)
Tower/Steel/T1( height=100ft,length=20ft, width=20ft)

as well as:

Steel/Building/B1( height=150ft,length=80ft,width=50ft)
Steel/Tower/ T1(height=100ft,length=20ft,width=20ft)
Wood/Building/B2( height=50ft,length=50ft,width=40ft)
Cement/Bridge/A1(height=100ft,length=200ft,width=50ft)

The above data can be searched with the following query: "Find all structures in Steel/* with height <=100 ft, length<=80 ft, width<=50 ft". This will resolve to return:

Steel/Tower/T1(height=100 ft,length=20 ft,width=20 ft)

using the trie structure followed by the range search.

Figure 23:
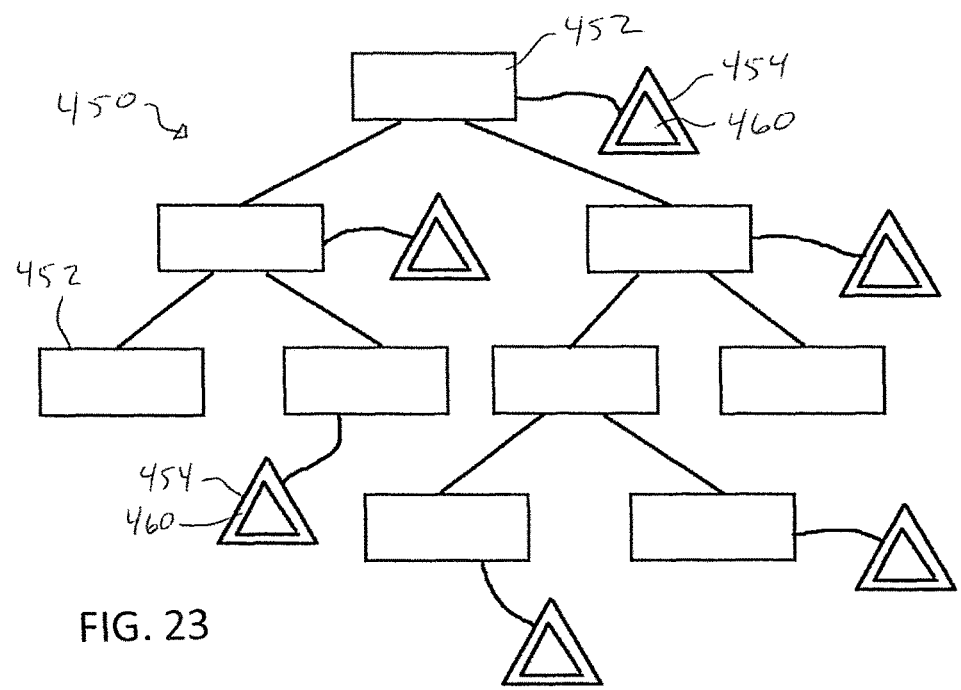
FIG. 23 shows an exemplary trie with embedded 3-D range structures, according to one embodiment of this invention.

Hierarchies can additionally be formed that allow for the geometric parameters to be separable. For example, if one classifies buildings located with x and y-coordinates within a certain range and then distinguishes by type of buildings, material of buildings etc. and subsequently by the height (z-parameter) in the hierarchical metalabel then the search structure could be constructed with these search structures interspersed. FIG. 23 shows a trie 450 with nodes 452 that include as 'nodes', for example, 3, 2 or 1-dimensional range search data structures 454, as appropriate, followed by additional trie structures 460 at the leaves of the range search trees 454.

The hierarchy of FIG. 23 can be used in searches in the following example set of metalabels: <Construction Material>/<height-range>/<Typeofstructure>/<length and width range>. Thus a query: "Steel/<height greater than 60>" reports:

Steel/Building/B1( height=150ft,length=80ft,width=50ft)
Steel/Tower/ T1(height=100ft,length=20ft,width=20ft)

Other variations or combination of height, length and width can be used.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention.

Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A computer-implemented method of storing and searching a plurality of data items in an existing first hierarchical structure on a non-transitory computer recordable storage medium, the method comprising:
    assigning with a data processor a plurality of user-defined metalabels to at least two data items, wherein more than one of the data items is assigned a same user-defined metalabel;
    the data processor creating one or more additional hierarchical structures organized as a function of the assigned metalabels, wherein the one or more additional hierarchical structures exist simultaneously with the first hierarchical structure, and wherein more than one of the plurality of data items is assigned a same user-defined metalabel are included in the same additional hierarchical structure;
    the data processor linking each of the plurality of user-defined metalabels to a corresponding data item;
    storing the one or more additional hierarchical file structures on the non-transitory computer recordable storage medium or a second non-transitory computer recordable storage medium associated with the data processor; and
    automatically updating the additional hierarchical file structures with the data processor when any of the plurality of data items is moved, modified, copied, or deleted;
    wherein each metalabel comprises a node in the additional hierarchical file structures and further comprising searching the additional hierarchical file structures by:
        identifying child nodes at each node having a search term;
        recursively searching and ordering the child nodes; and
        reporting as search results the metalabels according to the ordering.

2. The method of claim 1 where a data item is a file, web site member, or web page.

3. The method of claim 1 with the method automatically and individually weighting each of the user-defined metalabels as a function of a relevance of the at least one searchable term found in the corresponding data items;
    automatically associating the corresponding weighting with each of the user-defined metalabels; and
    automatically organizing and/or filtering searches of the metalabels using the weighting.

4. The method of claim 3, wherein the relevance is determined from a dynamic importance vector.

5. The method of claim 4, wherein the importance vector is based upon user metalabel access frequency.

6. The method of claim 3, wherein weighting each of the user-defined metalabels as a function of a relevance of the at least one term further comprises providing each of the metalabels with a corresponding static term matrix.

7. The method of claim 3, wherein weighting each of the user-defined metalabels as a function of a relevance of the at least one term comprises providing each of the metalabels with a corresponding static term matrix.

8. The method of claim 7, wherein the corresponding term matrix comprises a frequency of the at least one term for the each of the metalabels.

9. The method of claim 7, wherein each metalabel comprises a node in the plurality of hierarchical structures, and each node includes the corresponding term matrix.

10. The method of claim 9, wherein an internal node in the plurality of hierarchical structures comprises a combined matrix from corresponding child nodes.

11. The method of claim 3, further comprising automatically weighting the each of the user-defined metalabels as a function of a frequency of the at least one term in a corresponding data items.

12. The method of claim 3, further comprising:
    ranking the child nodes as a function of the search term.

13. The method of claim 12, wherein the search results comprises a lexicographic ordering of the metalabels and data items.

14. The method of claim 3, wherein one of the plurality of data items is assigned two different user-defined metalabels each having a different weighting.

15. The method of claim 3, wherein more than one of the plurality of data items is assigned a same user-defined metalabel to organize the more than one of the plurality of data items in a same hierarchical structure.

16. The method of claim 3, further comprising ordering a display of metalabels as a function of weighting values.

17. The method of claim 3, wherein the relevance is further determined from a dynamic importance vector as a function of user metalabel access.

18. The method of claim 9, wherein the corresponding term matrix comprises a frequency of the at least one term for the each of the metalabels.

19. A system comprising a data processor for storing and searching a plurality of data items in an existing first hierarchical structure on a non-transitory computer recordable storage medium, the system comprising executable instructions that when executed by the data processor perform instructions:
    assigning with a hardware data processor a plurality of user-defined metalabels to at least two data items, wherein more than one of the data items is assigned a same user-defined metalabel;
    creating one or more additional hierarchical structures organized as a function of the assigned metalabels, wherein the one or more additional hierarchical structures exist simultaneously with the first hierarchical structure, and wherein more than one of the plurality of data items is assigned a same user-defined metalabel are included in the same additional hierarchical structure;
    linking each of the plurality of user-defined metalabels to a corresponding data item;
    storing the one or more additional hierarchical file structures on the non-transitory computer recordable storage medium or a second non-transitory computer recordable storage medium associated with the data processor;
    automatically updating the hierarchical file structures with the data processor when any of the plurality of data items is moved, modified, copied, or deleted;
    wherein each metalabel comprises a node in the hierarchical file structures and further comprising:
    searching the hierarchical file structures by:
        identifying child nodes at each node having a search term;
        recursively searching and ordering the child nodes; and reporting as search results the metalabels according to the ordering.

20. The system of claim 19 where a data item is a file, web site member, or web page.

* * * * *